(12) United States Patent
Lee et al.

(10) Patent No.: US 11,546,013 B2
(45) Date of Patent: Jan. 3, 2023

(54) ELECTRONIC DEVICE PERFORMING RANGING OPERATION BY USING ULTRA WIDE-BAND AND OPERATION METHOD OF THE ELECTRONIC DEVICE

(71) Applicant: SAMSUNG ELECTRONICS CO., LTD., Suwon-si (KR)

(72) Inventors: Mingyu Lee, Suwon-si (KR); Kangjin Yoon, Suwon-si (KR); Seongah Jeong, Suwon-si (KR); Aditya Vinod Padaki, Mountain View, CA (US); Zheda Li, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 16/874,032

(22) Filed: May 14, 2020

(65) Prior Publication Data
US 2020/0366335 A1   Nov. 19, 2020

Related U.S. Application Data

(60) Provisional application No. 62/847,423, filed on May 14, 2019.

(51) Int. Cl.
*H04B 1/00* (2006.01)
*H04B 1/7163* (2011.01)
(Continued)

(52) U.S. Cl.
CPC ....... *H04B 1/71632* (2013.01); *H04L 12/413* (2013.01); *H04W 74/0875* (2013.01); *H04W 88/06* (2013.01)

(58) Field of Classification Search
CPC .......................... H04B 1/71632; H04B 1/0092; H04B 1/7172; H04L 12/413; H04L 25/03834;
(Continued)

(56) References Cited

U.S. PATENT DOCUMENTS 6,628,697 B1 * 9/2003 Douglas ................ H04J 3/0682
370/510
8,737,425 B2   5/2014 Wang et al.
(Continued)

FOREIGN PATENT DOCUMENTS

KR   10-2011-0088434 A   8/2011
KR       10-1520775 A   5/2015
(Continued)

OTHER PUBLICATIONS

International Search Report and Written Opinion (PCT/ISA/210 and PCT/ISA/237), dated Jun. 29, 2020 by International Searching Authority in International Application No. PCT/KR2020/003714.
(Continued)

*Primary Examiner* — Stephen M D Agosta
(74) *Attorney, Agent, or Firm* — Sughrue Mion, PLLC

(57) ABSTRACT

Provided are an electronic device that performs ranging by using an ultra wide-band (UWB) communication scheme and an operation method of the electronic device. The operation method of the first electronic device includes transmitting a first ranging control message (RCM) comprising interval information to a second electronic device, determining a first time to transmit a second RCM based on the interval information, determining a first RCM timing window (RTW) based on the first time, transmitting the second RCM to the second electronic device in the first RTW, and transmitting a third RCM at a second time in a second RTW, based on a failure to receive a response message corresponding to the second RCM within a specific time period in the first RTW, wherein the second time is a random time point in the second RTW.

12 Claims, 16 Drawing Sheets

(51) Int. Cl.
*H04W 74/08* (2009.01)
*H04W 88/06* (2009.01)
*H04L 12/413* (2006.01)

(58) Field of Classification Search
CPC .. H04W 74/0875; H04W 88/06; G01C 21/00; G01C 21/20; G05D 1/0274; G05D 1/028; H04M 1/72421; H04M 1/6066; H04M 1/72406; H04M 1/72412
See application file for complete search history.

(56) References Cited

U.S. PATENT DOCUMENTS

| | | | |
|---|---|---|---|
| 9,432,915 | B2 | 8/2016 | Cho et al. |
| 9,668,209 | B1* | 5/2017 | Knaappila ............ H04W 4/023 |
| 9,942,849 | B1* | 4/2018 | Hariharan ............ H04W 8/005 |
| 10,334,422 | B2* | 6/2019 | Abraham ............ H04W 8/005 |
| 10,488,509 | B2 | 11/2019 | McLaughlin et al. |
| 10,541,788 | B2* | 1/2020 | You ....................... H04L 1/1816 |
| 10,567,034 | B2 | 2/2020 | Hammerschmidt et al. |
| 10,578,743 | B1* | 3/2020 | Kalathil ................. G01S 19/48 |
| 2005/0266896 | A1* | 12/2005 | Son ....................... H04B 1/1615 |
| | | | 455/574 |
| 2006/0009242 | A1* | 1/2006 | Ryu ...................... H04W 68/02 |
| | | | 455/458 |
| 2007/0237188 | A1* | 10/2007 | Miguel ................. H04J 3/0682 |
| | | | 370/503 |
| 2009/0005092 | A1* | 1/2009 | Li ........................ H04W 28/18 |
| | | | 455/501 |
| 2010/0027462 | A1* | 2/2010 | Lee ...................... H04B 7/2681 |
| | | | 370/328 |
| 2010/0066603 | A1* | 3/2010 | O'Keefe ................ G01S 19/10 |
| | | | 342/357.29 |
| 2010/0225541 | A1* | 9/2010 | Hertzog ................. G01S 5/0221 |
| | | | 342/387 |
| 2010/0272066 | A1* | 10/2010 | Wang ................. H04W 74/0833 |
| | | | 370/331 |
| 2011/0292819 | A1* | 12/2011 | Ekbal .................... G01S 13/765 |
| | | | 370/252 |
| 2011/0292919 | A1 | 12/2011 | Magaque |
| 2011/0300895 | A1* | 12/2011 | Tsuruoka ............ H04W 52/246 |
| | | | 455/522 |
| 2014/0198741 | A1* | 7/2014 | Barriac ............... H04W 74/002 |
| | | | 370/329 |
| 2014/0368321 | A1* | 12/2014 | Namgoong ........... G01S 5/0226 |
| | | | 340/10.5 |
| 2016/0178727 | A1* | 6/2016 | Bottazzi ................. G06Q 30/06 |
| | | | 375/130 |
| 2016/0193729 | A1 | 7/2016 | Williams |
| 2018/0059235 | A1* | 3/2018 | McLaughlin ......... G01S 13/767 |
| 2018/0213492 | A1* | 7/2018 | Xia ........................ H04B 1/7183 |
| 2019/0135229 | A1* | 5/2019 | Ledvina ................. H04W 4/023 |
| 2020/0137676 | A1* | 4/2020 | Yoon ..................... H04W 48/16 |
| 2020/0359275 | A1* | 11/2020 | Li ........................ H04W 74/002 |
| 2022/0007333 | A1* | 1/2022 | Lee ....................... H04W 76/14 |
| 2022/0109561 | A1* | 4/2022 | Yang ...................... B60R 25/33 |

FOREIGN PATENT DOCUMENTS

| | | |
|---|---|---|
| KR | 10-1520775 B1 | 5/2015 |
| KR | 10-2018-0004092 A | 1/2018 |
| KR | 10-2019-0004240 A | 1/2019 |
| WO | 2007/021292 A2 | 2/2007 |

OTHER PUBLICATIONS

Communication dated May 3, 2022 issued by the European Patent Office in counterpart European Application No. 20806716.5.

* cited by examiner

FIG. 9

TX RCM
If no frame from controlee
- $C_{RCMfail}$ ++
- if $C_{RCMfail} > Thres_{RC}$
  - Reconnection
- $W_{result} = W_{II} + W_{step} * (2^{C_{RCMfail}-1} - 1)$
- if $W_{result} > RI$
  - Drop RI
- $T_{nextRCM} = T_{NR} + [-min(W_{result}, W_{max}, T_{NR} - T_{now}), min(W_{result}, W_{max})]$
- TX RCM at $T_{nextRCM}$ else
- $C_{RCMfail} = 0$
- TX RCM at
  $T_{NR} + [-min(W_{min}, W_{NR} - T_{now}) W_{min}]$

FIG. 10

If no RCM during RTM
- $C_{RCMfail}$ ++
- if $C_{RCMfail} > Thres_{RC}$
  - Reconnection
- $W_{result} = W_{II} + W_{step} * (2^{C_{RCMfail}-1} - 1)$
- Set RTW from
  $T_{NR} - min(W_{result}, W_{max}, T_{NR} - T_{now})$
  to
  $T_{NR} + min(W_{result}, W_{max}, RI)]$ else
- $C_{RCMfail} = 0$
- Set RTW from
  $T_{NR} - min(W_{min}, T_{NR} - T_{now})$
  to
  $T_{NR} + W_{min}$

FIG. 11

| Octets : 1 | 5 | 5 | 2 | 1 |
|---|---|---|---|---|
| Indicator | Block Interval | Round Interval | RIU Interval | Remaining Number of RIU messages |

+

| TBD | TBD | TBD | TBD |
|---|---|---|---|
| $W_{min}$ | $W_{max}$ | $W_{step}$ | $W_{II}$ |

FIG. 12

| Bits :1 | 1 | 1 | 1 | 3 | Octets: 4 | 0/4 | 0/2 | 0/1 | 0/1 | 0/2 |
|---|---|---|---|---|---|---|---|---|---|---|
| RIP | RIUP | RTWMP | RTWISP | Reserved | Block Interval | Round Interval | RIU Interval | Remaining Nimber of RIU messages | RTW Multiplier | RTW Initial Size |

# ELECTRONIC DEVICE PERFORMING RANGING OPERATION BY USING ULTRA WIDE-BAND AND OPERATION METHOD OF THE ELECTRONIC DEVICE

CROSS-REFERENCE TO RELATED APPLICATION(S)

This application is based on and claims priority from U.S. Provisional Patent Application No. 62/847,423, filed on May 14, 2019 in the United States Patent and Trademark Office, the disclosure of which is incorporated herein by reference in its entirety.

BACKGROUND

1. Field

The disclosure relates to an electronic device that performs ranging operation by using an ultra wide-band (UWB) communication scheme and an operation method of the electronic device.

2. Description of Related Art

Recently, the internet is evolving into Internet of Things (IoT), where distributed entities, such as objects, exchange and process information. Moreover, Internet of Everything (IoE) has also emerged, which is a combination of IoT technology and Big Data processing technology through connection with a cloud server, etc. To implement the IoT, technical elements, such as a sensing technology, a wired/wireless communication and network infrastructure, a service interface technology, and a security technology, are required. Recently, technologies, such as a sensor network, machine to machine (M2M), machine type communication (MTC), etc., for connection between things, have been researched.

Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Various services may be provided along with development of wireless communication systems, and accordingly, ways of effectively providing such services are required. For example, in medium access control (MAC), a ranging technique for measuring a distance between electronic devices using an ultra wide-band (UWB) may be used. UWB communication is a wireless communication technique using a very wide frequency band of several GHz or more in a baseband without using a radio frequency (RF) carrier.

SUMMARY

Accordingly, there is a need for a method of recovering from a failure in transmission and reception of a ranging control message (RCM) when an electronic device performs ranging operation with at least one electronic device by using an ultra wide-band (UWB) communication scheme.

Additional aspects will be set forth in part in the description which follows and, in part, will be apparent from the description, or may be learned by practice of the presented embodiments of the disclosure.

According to an aspect of the disclosure, an operation method of a first electronic device that performs ranging using an ultra wide-band (UWB) includes transmitting a first ranging control message (RCM) including interval information to a second electronic device, determining a first time to transmit a second RCM based on the interval information, determining a first RCM timing window (RTW) based on the first time, transmitting the second RCM to the second electronic device in the first RTW, and transmitting a third RCM at a second time in a second RTW, based on a failure to receive a response message corresponding to the second RCM within a specific time period in the first RTW, wherein the second time is a random time point in the second RTW.

According to another aspect of the disclosure, an operation method of a second electronic device that performs ranging by using an ultra wide-band (UWB) includes receiving a first ranging control message (RCM) including interval information from a first electronic device, determining a first time to receive a second RCM based on the interval information, determining a first RTW based on the first time, determining a second RTW based on the interval information, when the second RCM is not received in the first RTW, and receiving a third RCM in the second RTW.

According to another aspect of the disclosure, a first electronic device that performs ranging by using an ultra wide-band (UWB) includes a communicator, a memory, and at least one processor configured to control an operation of the first electronic device by executing a program stored in the memory, in which the at least one processor is further configured to transmit a first ranging control message (RCM) including interval information to a second electronic device, to determine a first time to transmit a second RCM based on the interval information, to determine a first RCM timing window based on the first time, to transmit the second RCM to the second electronic device in the first RCM timing window, and to transmit a third RCM at a second time in a second RCM timing window, based on a failure to receive a response message corresponding to the second RCM within a specific time period in the first RTW, wherein the second time is a random time point in the second RTW.

According to another aspect of the disclosure, a second electronic device that performs ranging by using an ultra wide-band (UWB) includes a communicator, a memory, and at least one processor configured to control an operation of the second electronic device by executing a program stored in the memory, in which the at least one processor is further configured to receive a first ranging control message (RCM) including interval information from a first electronic device, to determine a first time to receive a second RCM based on the interval information, to determine a first RCM timing window, based on the first time, and to determine a second RCM timing window based on the interval information, when the second RCM is not received in the first RCM timing window, and receive a third RCM in the second RCM timing window.

According to another aspect of the disclosure, there is provided an apparatus comprising: a memory storing one or more instructions, and a processor configured based on the one or more instructions to: transmit a first ranging control message (RCM) comprising interval information; transmit a second RCM in a first RCM timing window (RTW) based on the interval information; transmit a third RCM in a second RTW, based on a failure to receive a response message corresponding to the second RCM within a specific time period in the first RTW, wherein a first size of the first RTW is different from a second size of the second RTW.

According to another aspect of the disclosure, there is provided an apparatus comprising: a memory storing one or more instructions, and a processor configured based on the one or more instructions to: receive a first ranging control message (RCM) comprising interval information; obtain a first RCM timing window (RTW) based on the interval information for receiving a second RCM, obtain a second RTW to receive a third RCM, based on a failure to receive the second RCM in the first RTW, wherein a first size of the first RTW is different from a second size of the second RTW.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates pseudo code for describing an operation of a controller, according to an embodiment of the disclosure;

FIG. 10 illustrates pseudo code for describing an operation of a controller, according to an embodiment of the disclosure;

FIG. 11 illustrates a content field format of a ranging interval update information element (RIU IE), according to an embodiment of the disclosure;

FIG. 12 illustrates a content field format of an RIU IE, according to an embodiment of the disclosure;

DETAILED DESCRIPTION

Figure 1:
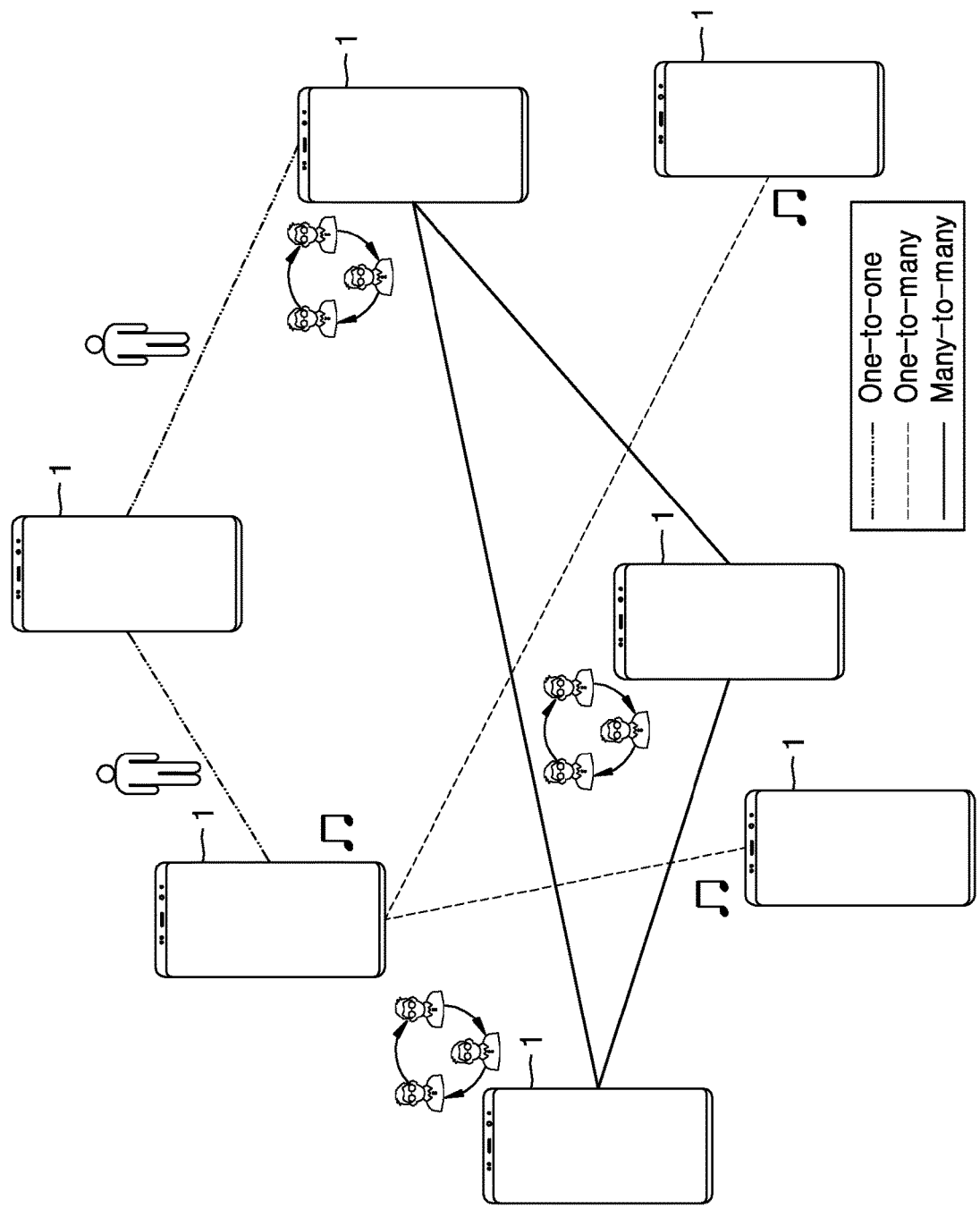
FIG. 1 is a diagram illustrating a device-to-device (D2D) communication procedure.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

Although terms used in the disclosure are selected with general terms popularly used at present under the consideration of functions in the disclosure, the terms may vary according to the intention of those of ordinary skill in the art, judicial precedents, or introduction of new technology. Thus, the terms used in the disclosure should be defined not by the simple names of the terms but by the meaning of the terms and the contents throughout the disclosure.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Terms such as first, second, and the like may be used to describe various elements, but the elements should not be limited to those terms. These terms may be used for the purpose of distinguishing one element from another element.

The terms used in the disclosure are for the purpose of describing particular exemplary embodiments only and are not intended to limit the disclosure. The singular forms are intended to include the plural forms as well, unless the context clearly indicates otherwise. Throughput the specification, when a part is connected to another part, the part is not only directly connected to another part but also electrically connected to another part with another device intervening in them. When it is assumed that a certain part includes a certain component, the term "including" means that a corresponding component may further include other components unless a specific meaning opposed to the corresponding component is written.

Throughout the present specification, the use of "the" and other demonstratives similar thereto may correspond to both a singular form and a plural form. Unless the order of operations of a method according to the disclosure is explicitly mentioned or described otherwise, the operations may be performed in a proper order. The disclosure is not limited by the order the operations are mentioned.

Phrases used in various parts of the present specification, such as "in some embodiments" and "in an embodiment", do not necessarily indicate the same embodiment.

An embodiment of the disclosure may be represented by block components and various process operations. All or some of such functional blocks may be implemented by various numbers of hardware and/or software components which perform specific functions. For example, functional blocks of the disclosure may be implemented with one or more microprocessors or circuit elements for a specific function. The functional blocks of the disclosure may also be implemented with various programming or scripting languages. Functional blocks may be implemented as an algorithm executed in one or more processors. Furthermore, the disclosure may employ any number of conventional techniques for electronics configuration, signal processing and/or control, data processing and the like.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Generally, wireless sensor network technologies are classified into a wireless local area network (WLAN) technology and a wireless personal area network (WPAN) technology, according to a recognition distance thereof. The WLAN technology is based on the IEEE 802.11 and enables connection to a backbone network within a radius of 100 m. The WPAN technology is based on the IEEE 802.15 and enable connections in a shorter range than the WLAN technology. The WPAN technology and includes Bluetooth, Zigbee, an ultra wide-band (UWB), etc. A wireless network where such wireless network technologies are implemented may include multiple communication electronic devices. The multiple communication electronic devices perform communication in an active period using a single channel. That is, communication electronic devices may collect a packet and transmit the collected packet, in an active period.

The UWB may refer to a short-range high-speed wireless communication technology using a wide frequency band of several GHz or more in a baseband, a low spectrum density, and a short pulse width (1-4 nsec). The UWB may refer to a band to which UWB communication is applied. While a ranging operation between electronic devices will be described based on a UWB communication scheme, this is merely an example and various wireless communication techniques may be actually used.

An electronic device according to embodiment of the disclosure may include a fixed terminal implemented with a computer device or a mobile terminal, and may communicate with another device and/or a server by using a wireless or wired communication scheme. For example, an electronic device may include a smart phone, a mobile terminal, a laptop computer, a digital broadcasting terminal, a personal digital assistant (PDA), a portable multimedia player (PMP), a navigation device, a slate personal computer (PC), a tablet PC, a desktop computer, a digital television (TV), a refrigerator, an artificial intelligence (AI) speaker, a wearable device, a projector, a smart key, a smart car, a printer, etc., without being limited to these examples.

Hereinafter, the disclosure will be described with reference to the accompanying drawings.

FIG. 1 is a diagram illustrating a device-to-device (D2D) communication procedure.

D2D communication refers to a scheme that enables geographically adjacent electronic devices 1 to directly communicate with one another without using an infrastructure such as a base station. As illustrated in FIG. 1, electronic devices 1 may communicate in a one-to-one (1:1) manner, a one-to-many (1:N) manner, or a many-to-many (N:N) manner. D2D communication may use an unlicensed frequency band such as wireless fidelity (Wi-Fi) Direct, Bluetooth, etc. D2D communication may also improve frequency use efficiency of a cellular system by using a licensed frequency band. D2D communication is restrictively used as a term indicating thing-to-thing communication or machine-to-machine (M2M) communication, but D2D communication in the disclosure may also include communication between various types of electronic devices such as not only a simple electronic device having a communication function, but also a smart phone or a PC having a communication function.

Figure 2:
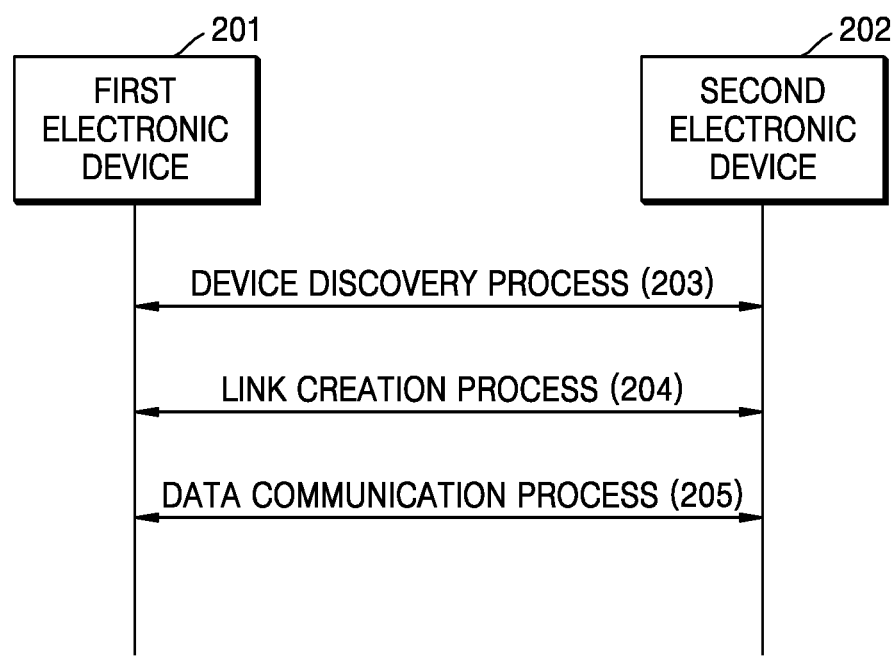
FIG. 2 is a diagram showing a communication process of a plurality of electronic devices.

FIG. 2 is a diagram showing a communication process of a plurality of electronic devices.

A first electronic device 201 and a second electronic device 202 may communicate with each other through a device discovery process 203, a link creation process 204, and a data communication process 205.

In the device discovery process 203, each of the first electronic device 201 and the second electronic device 202 may discover other electronic devices capable of performing D2D communication among nearby electronic devices. In this way, each of the first electronic device 201 and the second electronic device 202 may determine whether to create a link for performing D2D communication. For example, the first electronic device 201 may transmit a discovery signal to allow the second electronic device 202 to discover the first electronic device 201. The first electronic device 201 may receive a discovery signal transmitted from the second electronic device 202 to identify that the other electronic devices capable of performing D2D communication fall within a D2D communication range.

In the link creation process 204, each of the first electronic device 201 and the second electronic device 202 may create a link for data transmission with an electronic device, which is to transmit data, among electronic devices discovered in the device discovery process 203. For example, the first electronic device 201 may create a link for data transmission with the second electronic device 202 discovered in the device discovery process 203.

In the data communication process 205, each of the first electronic device 201 and the second electronic device 202 may transmit and receive data to and from devices having created a link in the link creation process 204. For example, the first electronic device 201 may transmit and receive data to and from the second electronic device 202 through a link created in the link creation process 204.

Various embodiments of the disclosure relate to a medium access control (MAC) based on the foregoing D2D communication, in which a distance between electronic devices needs to be measured for the MAC. To measure the distance between the electronic devices, UWB ranging may be used. For example, when a digital key stored in a smart phone is used to open and close a door of a vehicle, the vehicle may measure a distance between the smart phone and the vehicle by using multiple UWB communication modules (e.g., six UWB communication modules) and then measure a location of the smartphone based on a measurement result. When the vehicle and the smart phone come close to each other by a certain distance or shorter, the vehicle may automatically open the door to improve user convenience. The vehicle and the smart phone may use multicast ranging operation or broadcast ranging operating.

According to an embodiment of the disclosure, the electronic device may perform ranging (or ranging control) operation by using a ranging control frame. While performing the ranging (or the ranging control) operation, the electronic device may be operate as a "controller" or a "controlee".

First, the controller may be defined as a device that defines and controls ranging parameters by transmitting a ranging control frame together with a ranging control information element (IE). The ranging control frame may be used to set ranging parameters used for ranging. In the disclosure, a 'ranging control frame' and a 'ranging control message (RCM)' may be used for the same meaning.

The controlee may be defined as a device using ranging parameters received from the controller. At least one controlee may be managed by the controller. Determination of a role of a device (e.g., a role of the controller or a role of the controlee, and a role of an initiator or a role of a responder) and selection of ranging parameters may be implemented in various ways.

Also, while performing the ranging (or the ranging control) operation, the electronic device may be operate as an "initiator" or a "responder". The initiator may be a device that initiates ranging by transmitting a poll. The responder may be a device that responds to a poll received from the initiator. Determination of a role of the initiator or a role of the responder and selection of ranging parameters may be implemented in various ways.

Figure 3:
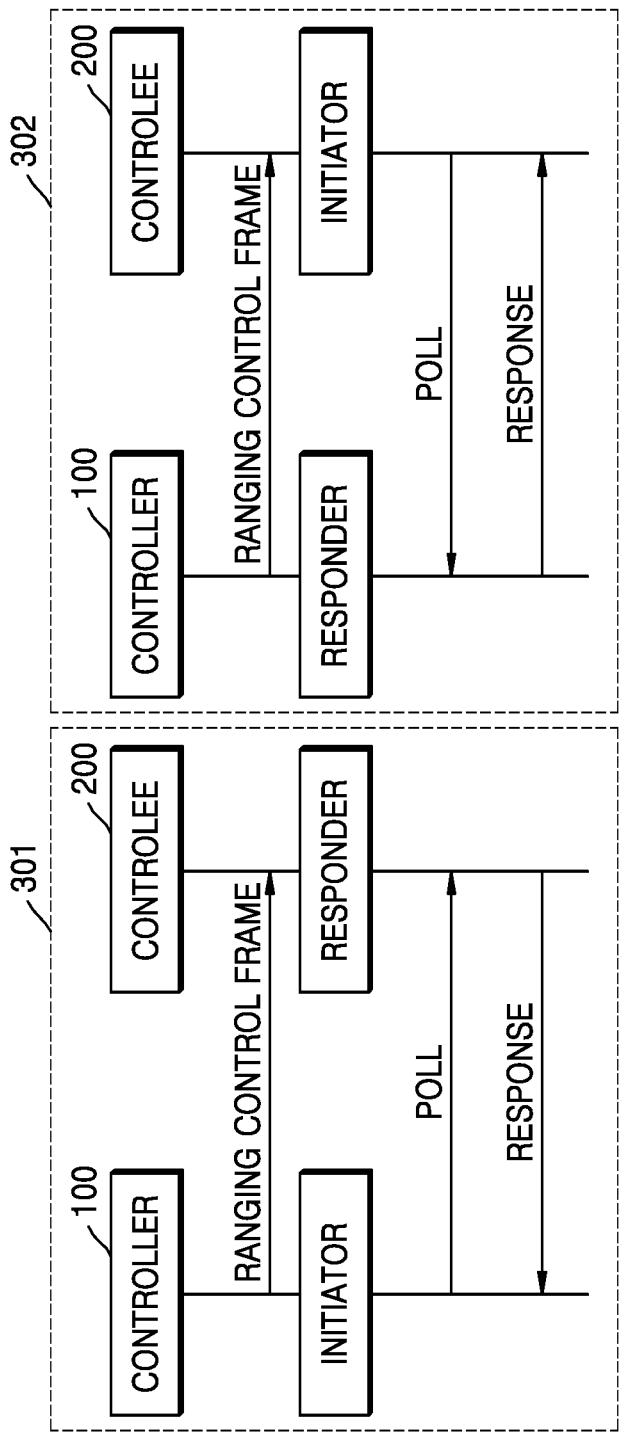
FIG. 3 illustrates an example of single-sided two-way ranging (SS-TWR) using a ranging control frame.

FIG. 3 illustrates an example of single-sided two-way ranging (SS-TWR) using a ranging control frame.

As shown in a flowchart 301 of FIG. 3, when a controller 100 is configured to transmit a poll frame by a ranging control frame, the controller 100 may transmit the poll frame as an initiator. On the other hand, as shown in a flowchart 302 of FIG. 3, when a controller 200 is configured to transmit a poll frame by a ranging control frame, the controller 200 may transmit the poll frame as an initiator. Electronic devices may perform ranging in an unit of a ranging round. The ranging round may indicate a period required for completion of one entire range measurement cycle between a pair of ranging devices that join ranging exchange. The ranging round may include a plurality of ranging slots. The ranging slot may indicate a period required for transmission of one ranging frame.

Figure 4:
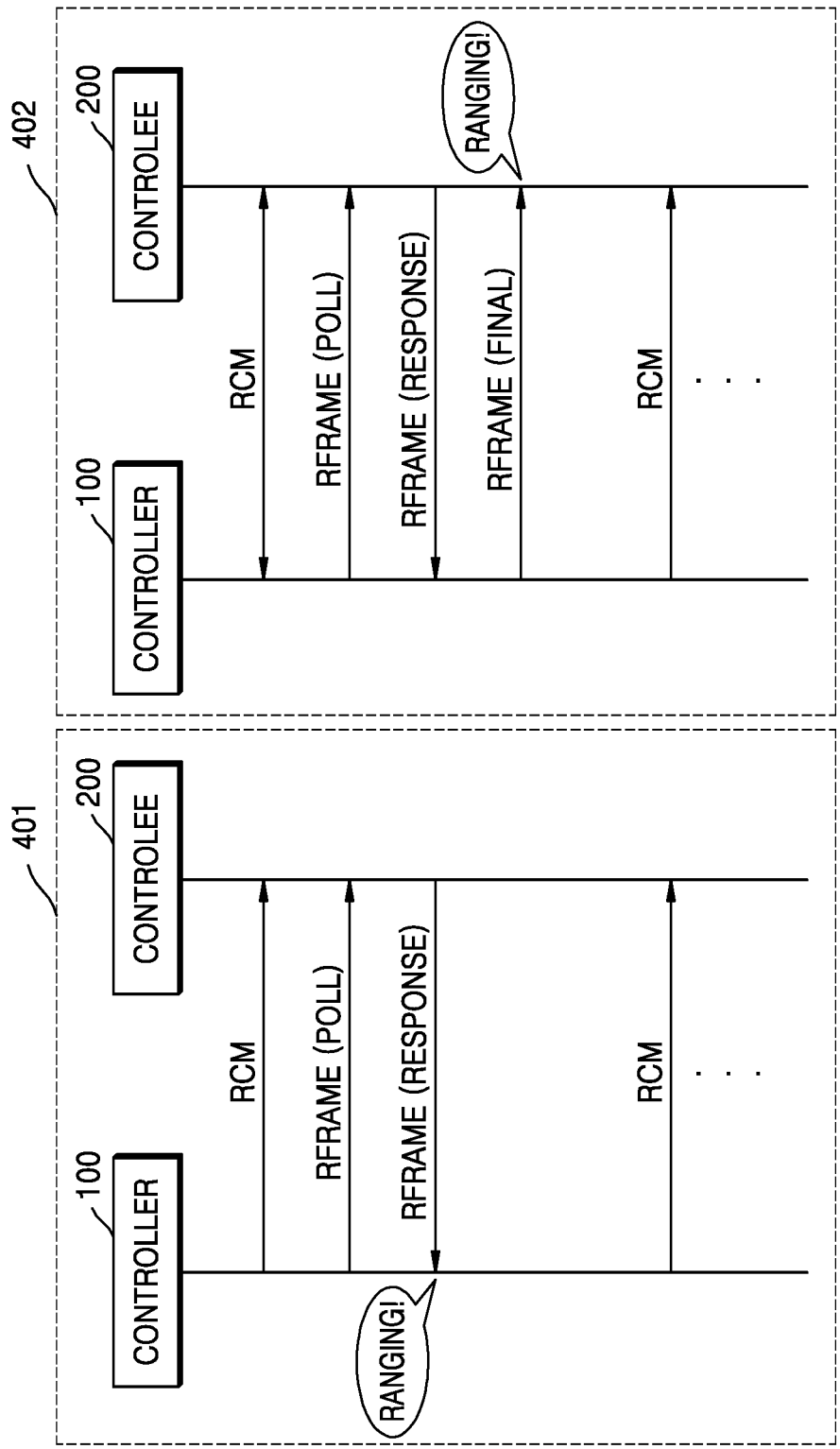
FIG. 4 illustrates an example of SS-TWR and double-sided two-way ranging (DS-TWR) operation which use a ranging control frame.

FIG. 4 illustrates an example of SS-TWR and double-sided two-way ranging (DS-TWR) which use a ranging control frame.

The device according to an embodiment of the disclosure may perform ranging in various manners. For example, the device according to an embodiment of the disclosure may perform SS-TWR or DS-TWR.

A flowchart 401 of FIG. 4 shows a process in which the controller 100 and the controlee 200 perform SS-TWR.

The SS-TWR performs ranging by measuring a round-trip delay of one message transmitted from one device to another device and a response returned to the device.

As shown in the flowchart 401 of FIG. 4, when the controller 100 is configured to transmit a poll frame, the controller 100 may transmit the poll frame as an initiator. The controlee 200 may transmit a response frame to the poll frame. The controller 100 or the controlee 200 may perform ranging based on a propagation time of each of the poll frame and the response frame. However, the disclosure is not limited to an example shown in the flowchart 401 of FIG. 4, and the controlee 200 may be configured to transmit the poll frame.

A flowchart 402 of FIG. 4 shows a process in which the controller 100 and the controlee 200 perform DS-TWR.

The DS-TWR, an extension of the SS-TWR, may derive a time-of-flight (TOF) result by measuring a round trip time twice and combining the round trip time results.

As shown in the flowchart 402 of FIG. 4, when the controller 100 is configured to transmit a poll frame, the controller 100 may initiate first round trip time measurement by transmitting the poll frame as an initiator. The controlee 200 may initiate second round trip time measurement by transmitting a response frame to the poll frame. The controller 100 may transmit a final frame in response to the respond frame.

The controller 100 or the controlee 200 may perform the first round trip time measurement based on the propagation time of the poll frame and the propagation time of the response time, and perform the second round trip time measurement based on a propagation time of the response time and a propagation time of the final frame. The controller 100 or the controlee 200 may calculate a transmission time based on the first round trip time measurement and the second round trip time measurement. However, the disclosure is not limited to an example shown in the flowchart 402 of FIG. 4, and the controlee 200 may be configured to transmit the poll frame.

As shown in FIG. 4, when ranging is performed in various manners, the controller 100 according to an embodiment of the disclosure may control ranging by transmitting an RCM. The RCM may include information about a round interval of a next ranging round of the current ranging round. The round interval of the next ranging round may indicate a start time of the next ranging round. The RCM may include information about when or which to transmit or a ranging frame (e.g., a poll frame, a response frame, etc.) to be transmitted in the next ranging round.

The general controller 100 may transmit an RCM at an agreed timing based on round interval information included in the RCM. The general controlee 200 may wake up to receive an RCM at an agreed timing based on round interval information included in the most recently received RCM. When the controlee 200 is awake, it may mean that a UWB communication module included in the controlee 200 is in an active state or may mean that the UWB communication is in a standby state to receive the RCM.

Figure 5:
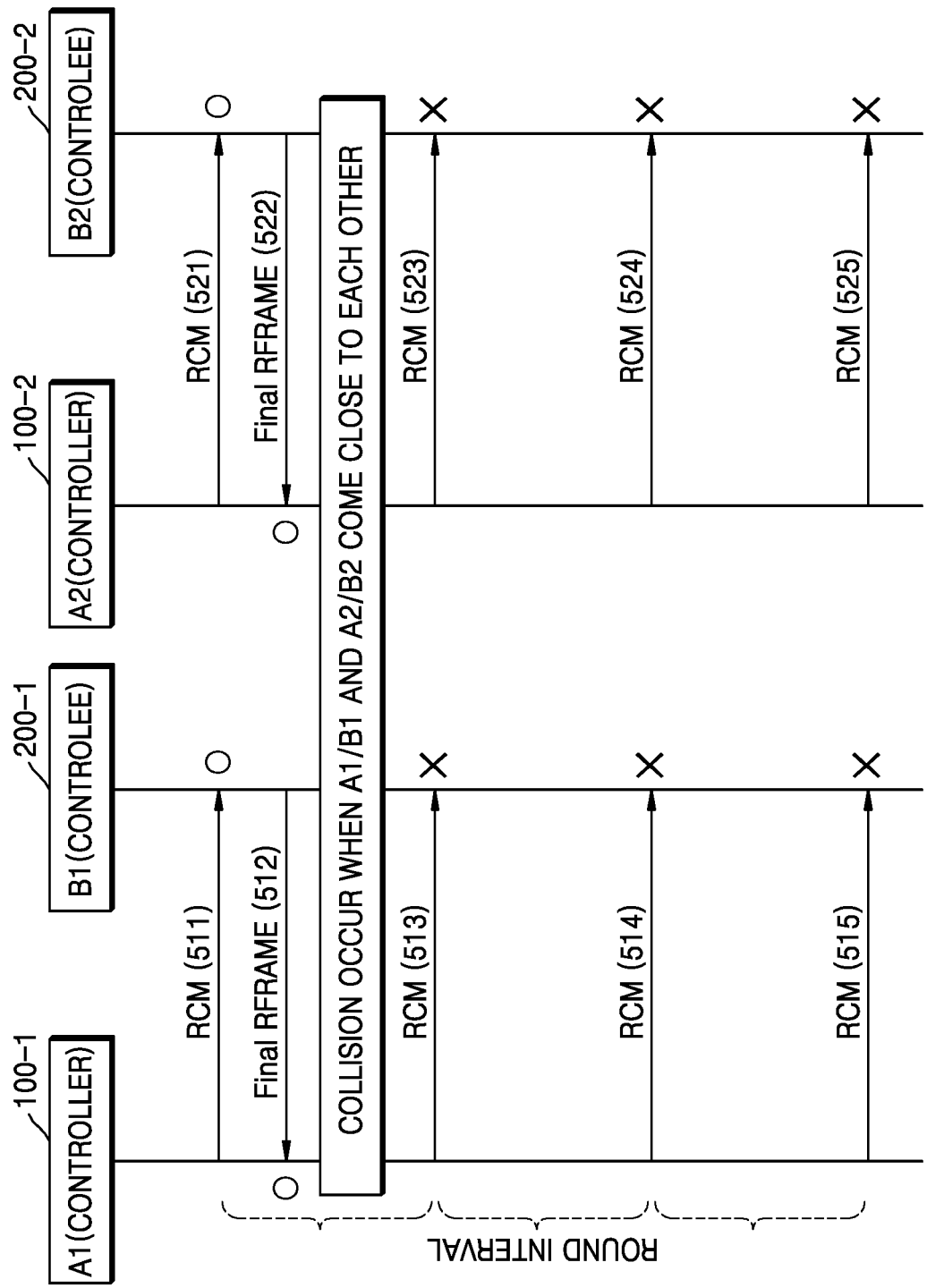
FIG. 5 illustrates a continuous ranging failure process of electronic devices.

FIG. 5 illustrates a continuous ranging failure process of electronic devices.

FIG. 5 shows a case where a first pair of a controller A1 100-1 and a controlee B1 200-1 performs ranging and a second pair of a controller A2 100-2 and a controlee B2 200-2 performs ranging.

The controller A1 100-1 may initiate a ranging round by transmitting an RCM 511 to the controlee B1 200-1, and perform ranging by receiving at least one ranging frame 512. The controller A2 100-2 may initiate a ranging round by transmitting an RCM 521 to the controlee B2 200-2, and perform ranging by receiving at least one ranging frame 522.

When the first pair of the controller A1 100-1 and the controlee B1 200-1 and the second pair of the controller A2 100-2 and the controlee B2 200-2 are sufficiently far way from each other, the ranging operations performed by the respective pairs (A1/B1 and A2/B2) are not disturbed even when the same transmission timing or close transmission timings are used for the RCM. However, when the first pair of the controller A1 100-1 and the controlee B1 200-1 and the second pair of the controller A2 100-2 and the controlee B2 200-2 come close to each other by a certain distance or shorter, collision may occur when a time point for the controller A1 100-1 to transmit an RCM 513 and a time point for the controlee A2 100-2 to transmit an RCM 523 are the same as or close to each other.

FIG. 5 shows as a comparative example, a case where the controller A1 100-1 and the controller A2 100-2 use a round interval of the same size. As shown in FIG. 5, when two pairs that are sufficiently close to each other use the same round interval, upon occurrence of collision in RCM transmission in a ranging round, collision may continuously occur in subsequent ranging rounds.

The controlee B1 200-1 fails to receive the RCM 513 in a second round among ranging rounds shown in FIG. 5, and therefore the controlee B1 200-1 will be awake at a time point determined based on interval information included in the most recently successfully received RCM 511. The controlee B2 200-2 fails to receive the RCM 523 in a second round among ranging rounds shown in FIG. 5, and therefore the controlee B2 200-2 will be awake at a time point determined based on interval information included in the most recently successfully received RCM 521.

Thus, collision may occur between a time point at which the controller A1 100-1 and the controller A2 100-2 using the same round interval transmit an RCM 514 and a time point at which they transmit an RCM 524. As a result, the controlee B1 200-1 and the controlee B2 200-2 may not be able to receive the RCM 514 and the RCM 524. In the next ranging round, collision may also occur between a time point at which the controller A1 100-1 transmits an RCM 515 and a time point at which the controller A2 100-2 transmits an RCM 525, such that the controlee B1 200-1 and the controlee B2 200-2 may not be able to receive the RCM 515 and the RCM 525.

Accordingly, in the comparative example ranging method illustrated in FIG. 5, when pairs of electronic devices using the same round interval are located close to each other, consecutive ranging failures may occur. According to an embodiment of the disclosure, to solve such a problem, a ranging operation using an RCM timing window is proposed. According to an embodiment of the disclosure, to solve consecutive ranging failures, a method of transmitting an RCM determined in an RCM timing window is proposed.

Figure 6:
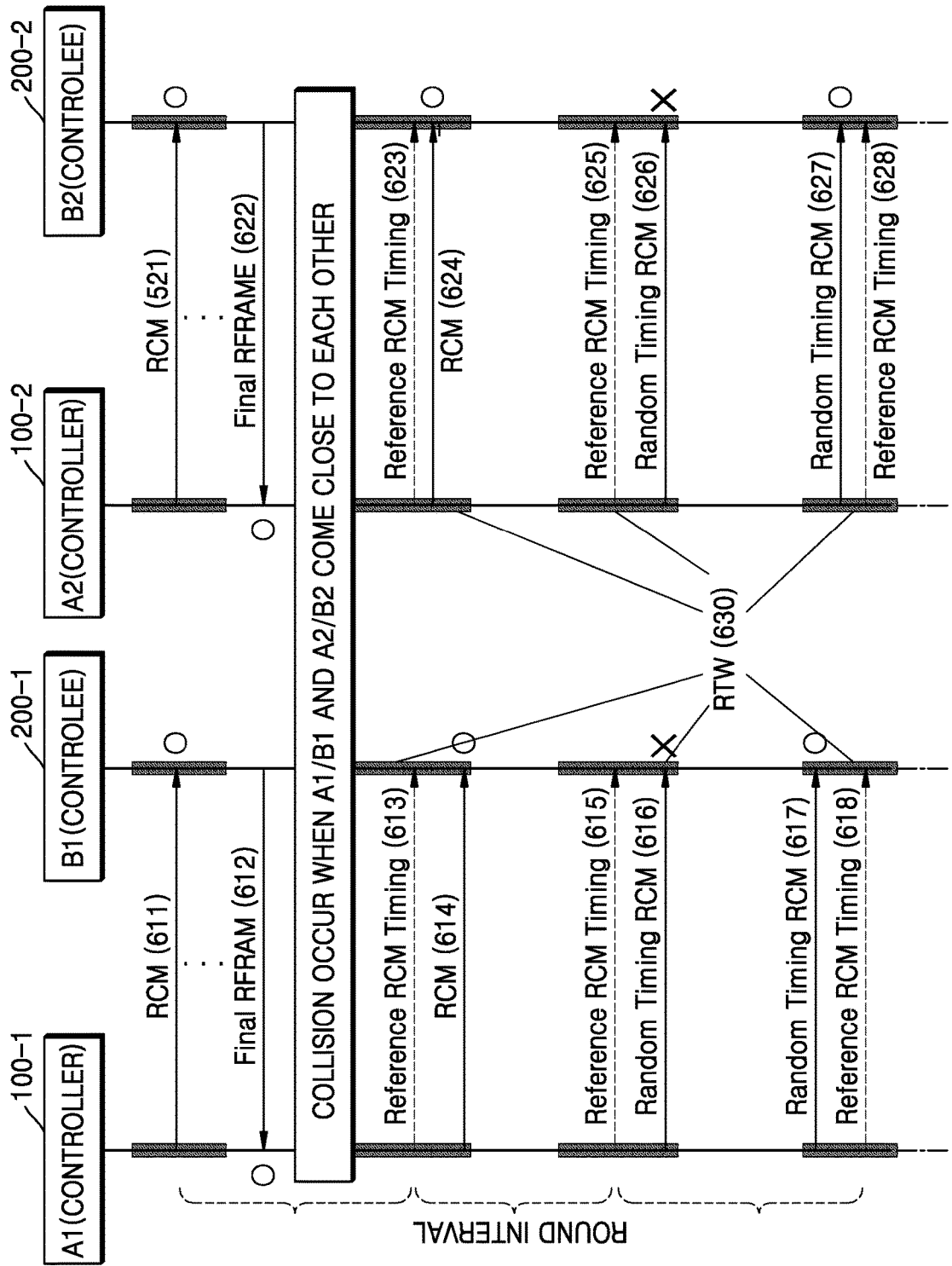
FIG. 6 illustrates a process in which electronic devices recover from a ranging failure by transmitting a ranging control message (RCM) using an RCM timing window, according to an embodiment of the disclosure.

FIG. 6 illustrates a process in which electronic devices recover from a ranging failure by transmitting an RCM using an RCM timing window, according to an embodiment of the disclosure.

The controller 100 and the controlee 200 according to an embodiment of the disclosure may exchange an RCM within an RCM timing window (RTW), instead of exchanging an RCM at a time point determined based on a round interval. The RCM timing window may refer to a time period that is set to exchange ROMs. The RCM timing window may be a pre-agreed time period. The controller 100 according to an embodiment of the disclosure may transmit an RCM at a time point determined at random within an RCM timing window, and the controlee 200 may be awake during an RCM timing window to stand by until reception of an RCM.

FIG. 6 shows a case where the controller A1 100-1 and the controlee B1 200-1 perform ranging and the controller A2 100-2 and the controlee B2 200-2 perform ranging.

The controller A1 100-1 may initiate a ranging round by transmitting an RCM 611 to the controlee B1 200-1, and perform ranging operation by receiving at least one ranging frame 612. The controller A2 100-2 may initiate a ranging round by transmitting an RCM 621 to the controlee B2 200-2, and perform ranging operation by receiving at least one ranging frame 622. As shown in FIG. 6, when the first pair of the controller A1 100-1 and the controlee B1 200-1 and the second pair of the controller A2 100-2 and the controlee B2 200-2 are sufficiently far away from each other, the ranging operations performed by the respective pairs (A1/B1 and A2/B2) are not disturbed even when the same transmission timing or close transmission timings of an RCM.

However, when the first pair of the controller A1 100-1 and the controlee B1 200-1 and the second pair of the controller A2 100-2 and the controlee B2 200-2 come close to each other by a certain distance or shorter, collision may occur when a time point for the controller A1 100-1 to transmit an RCM and a time point for the controlee A2 100-2 to transmit an RCM are the same as or close to each other.

According to an embodiment of the disclosure, the controller A1 100-1 may initiate a ranging round by transmitting an RCM 614 to the controlee B1 200-1 at a time point determined at random within an RCM timing window 630 determined based on a reference RCM timing 613. The reference RCM timing 613 may be determined based on interval information included in the RCM 611. The controller A2 100-2 may initiate a ranging round by transmitting an RCM 624 to the controlee B2 200-2 at a time point determined at random within an RCM timing window 630 determined based on a reference RCM timing 623. Thus, as shown in FIG. 6, even when the reference RCM timing 613 of the first pair and the reference RCM timing 623 of the second pair overlap each other and the pairs use the same RCM timing window 630, collision may not occur between the time point at which the RCM 614 is transmitted and the time point at which the RCM 624 is transmitted.

However, as shown in FIG. 6, when a reference RCM timing 615 of the first pair (A1/B1) and a reference RCM timing 625 of the second pair (A2/B2) overlap each other, the pairs (A1/B1 and A2/B2) use the same RCM timing window 630, and the time point at which the RCM 616 is transmitted and the time point at which the RCM 626 is transmitted overlap each other, then collision may occur.

The controlee B1 200-1 fails to receive the RCM 616 in a third round among ranging rounds shown in FIG. 6, thus being awake at a time point determined based on interval information included in the most recently successfully received RCM 614. The controlee B2 200-2 also fails to receive the RCM 626 in the third round among ranging rounds shown in FIG. 6, thus being awake at a time point determined based on interval information included in the most recently successfully received RCM 624.

Thus, when the reference RCM timing 615 of the first pair and the reference RCM timing 625 of the second pair, which use the same round interval, overlap each other, a reference RCM timing 618 of the first pair and a reference RCM timing 628 of the second pair overlap each other.

However, according to an embodiment of the disclosure, even when the reference RCM timing 618 of the first pair and the reference RCM timing 628 of the second pair overlap each other in the next ranging round, a time point, determined at random, at which an RCM 617 is transmitted and a time point at which an RCM 627 is transmitted do not overlap each other, thus immediately recovering from a ranging failure in the next ranging round.

As a value of an RCM timing window increases, power consumption may increase in spite of more contention-resilient property. Thus, device performance may be affected by the value of the RCM timing window, such that it is necessary to adjust the RCM timing window adaptively for an operation circumstance of a device.

For example, device performance may be affected by at least one of a value of an RCM timing window in case of successful transmission and reception of an RCM, a value of an RCM timing window after a failure in single transmission of an RCM, a step value for increasing a size of the RCM timing window (or an RTW size) after consecutive failures in transmission of an RCM, or a maximum value of an RCM timing window.

Figure 7:
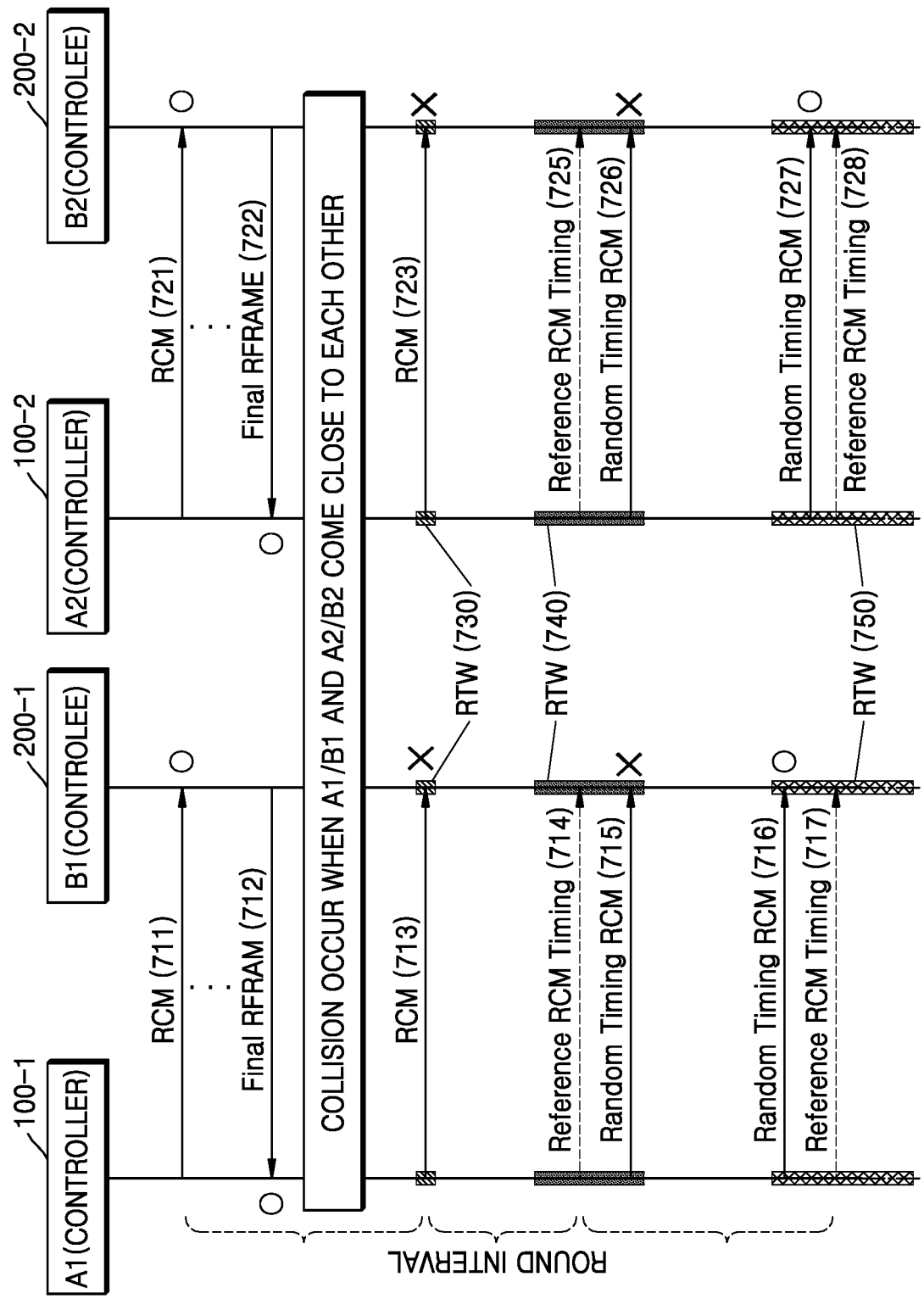
FIG. 7 illustrates a process in which electronic devices adjust an RCM timing window, according to an embodiment of the disclosure.

FIG. 7 illustrates a process in which electronic devices adjust an RCM timing window, according to an embodiment of the disclosure.

FIG. 7 shows a case where the controller A1 100-1 and the controlee B1 200-1 perform ranging operation and the controller A2 100-2 and the controlee B2 200-2 perform ranging operation.

The controller A1 100-1 may initiate a first ranging round by transmitting an RCM 711 to the controlee B2 200-1, and perform ranging operation by receiving at least one ranging frame 712. The controller A2 100-2 may initiate the first ranging round by transmitting an RCM 721 to the controlee B2 200-2, and perform ranging operation by receiving at least one ranging frame 722. As shown in FIG. 7, when the first pair of the controller A1 100-1 and the controlee B1 200-1 and the second pair of the controller A2 100-2 and the controlee B2 200-2 are sufficiently far away from each other, the ranging operations performed by the respective pairs (A1/B1 and A2/B2) are not disturbed even when there is overlap in the transmission timings of an RCM.

However, when the first pair of the controller A1 100-1 and the controlee B1 200-1 and the second pair of the controller A2 100-2 and the controlee B2 200-2 become close to each other by a certain distance or shorter in the second ranging round, collision may occur when a time point for the controller A1 100-1 to transmit an RCM 713 in an RCM timing window 730 and a time point for the controlee A2 100-2 to transmit an RCM 723 in the RCM timing window 730 are the same as or close to each other.

According to an embodiment of the disclosure, a failure in transmission and reception of an RCM may increase a size of an RCM timing window (RTW), thus reducing a probability of collision between next ROMs. In case of a failure in transmission of an RCM using the RCM timing window 730 in the second ranging round shown in FIG. 7, the controller A1 100-1 and the controller A2 100-2 may use a size-increased RCM timing window 740 in a third ranging round.

According to an embodiment of the disclosure, the controller A1 100-1 may initiate a ranging round by transmitting an RCM 715 to the controlee B1 200-1 at a time point determined at random within the RCM timing window 740 determined based on a reference RCM timing 714. The controller A2 100-2 may initiate a ranging round by transmitting an RCM 726 to the controlee B2 200-2 at a time point determined at random within the RCM timing window 740 determined based on a reference RCM timing 725.

FIG. 7 shows a case where collision consecutively occurs when a time point for the controller A1 100-1 to transmit an RCM 715 in an RCM timing window 740 and a time point for the controlee A2 100-2 to transmit an RCM 726 in the RCM timing window 740 are the same as or close to each other.

The controller 100 and the controlee 200 according to an embodiment of the disclosure may increase an RTW size upon an increase in the number of failures in transmission of an RCM, thus reducing a probability of collision between next ROMs. In case of a failure in transmission of an RCM using the RCM timing window 740 in the third ranging round, the controller A1 100-1 and the controller A2 100-2 may use a size-increased RCM timing window 750 in a fourth ranging round.

The controller A1 100-1 may initiate a ranging round by transmitting an RCM 716 to the controlee B1 200-1 at a time point determined at random within the RCM timing window 750 determined based on a reference RCM timing 717. The controller A2 100-2 may initiate a ranging round by transmitting an RCM 727 to the controlee B2 200-2 at a time point determined at random within the RCM timing window 750 determined based on a reference RCM timing 728. As shown in FIG. 7, a probability of collision between ROMs is reduced by an increase in the size of the RCM timing window 750, and thus even when the reference RCM timing 717 of the first pair and the reference RCM timing 728 of the second pair overlap each other and the pairs use the same RCM timing window 750, collision may not occur between the time point at which the RCM 716 is transmitted and the time point at which the RCM 727 is transmitted.

Figure 8:
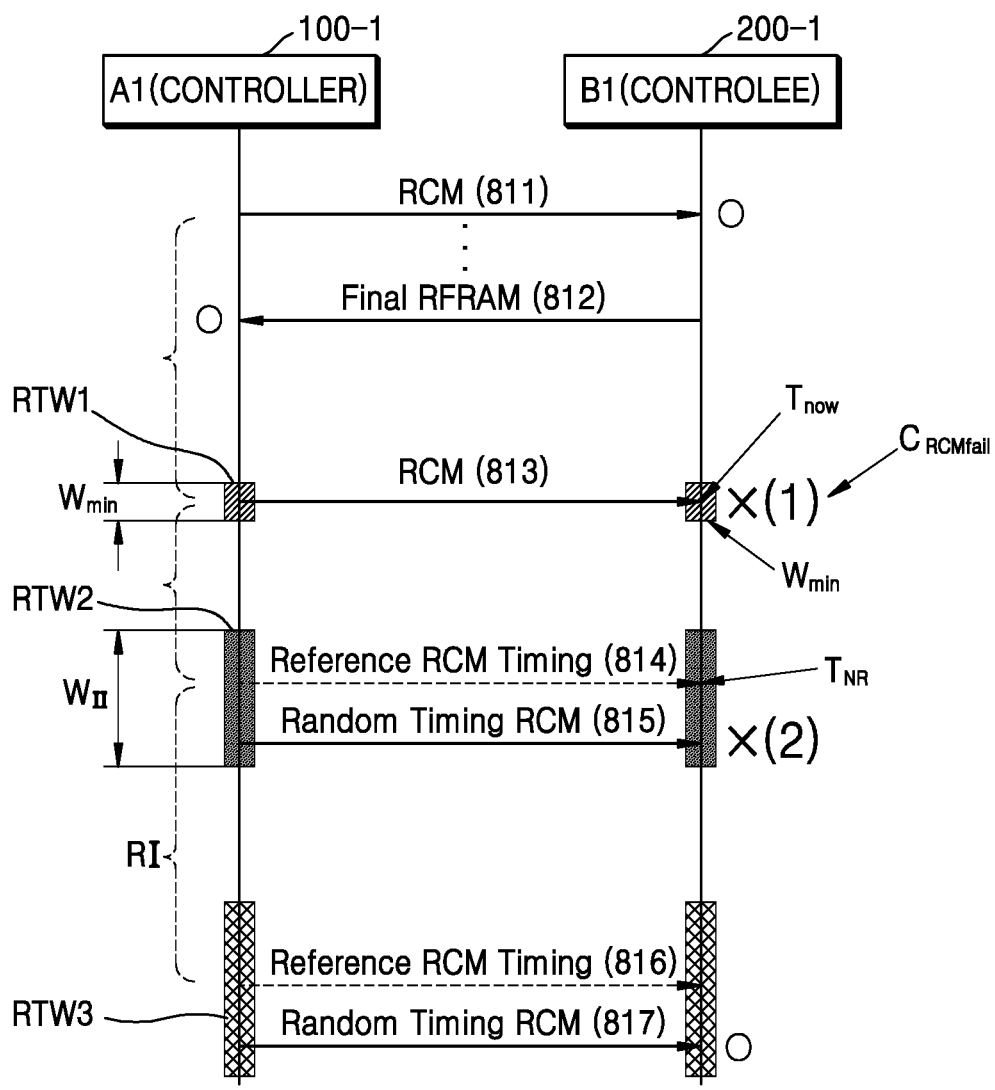
FIG. 8 illustrates parameters used when electronic devices adjust an RCM timing window, according to an embodiment of the disclosure.

Hereinafter, operations of the controller 100 and the controlee 200 according to an embodiment of the disclosure will be described in more detail using pseudo code, with reference to FIGS. 8 through 10. FIG. 8 is a diagram for illustrating parameters used in the pseudo codes of FIGS. 9 and 10.

FIG. 8 shows as an example, a case where ranging is performed between the controller A1 100-1 and the controller B1 200-1.

The controller A1 100-1 may initiate the first ranging round by transmitting an RCM 811 to the controlee B1 200-1, and perform the ranging operation by receiving at least one ranging frame 812. The RCM 811 may include interval information and information related to an RCM timing window RTW1. For successful transmission of an RCM 811 in the first ranging round, the controller A1 100-1 may transmit an RCM 813 within an RCM timing window range RTW1 determined based on a minimum window size $W_{min}$ included in the RCM 811 in the second ranging round.

When a response message responding to transmission of an RCM 813 is not received from the controller B1 200-1 within a preset time range, the controller A1 100-1 may determine that transmission of the RCM 813 fails. For failed transmission of the RCM 813 in the second ranging round, the controller A1 100-1 may transmit an RCM 815 within an RCM timing window range RTW2 determined based on an initially increased window size $W_{II}$ in the third ranging round. The controller A1 100-1 may determine a reference RCM timing 814 based on interval information included in the RCM 811 and determine an increased-size RCM timing window range based on the reference RCM timing 814. The controller A1 100-1 may initiate the third ranging round by transmitting an RCM 815 to the controlee B1 200-1 at a time point determined at random within the determined RCM timing window.

For failed transmission of the RCM 815 in the third ranging round, the controller A1 100-1 may further increase an RTW size in the fourth ranging round and transmit an RCM 817 within an RCM timing window range RTW3 determined based on a reference RCM timing 816. The controller 100 and the controlee 200 according to an embodiment of the disclosure may enable fast recovery from a transmission failure by increasing an RTW size upon an increase in the number of failures in transmission of an RCM.

In FIG. 8, $T_{now}$ may indicate a current timing, $T_{NR}$ may indicate a next reference RCM timing determined based on interval information, and $C_{RCM\_fail}$ may indicate a counter indicating consecutive RCM failures. RI may indicate a round interval specified by interval information included in the most recently successful RCM. The round interval RI needs to be greater than $W_{min}$. Although not shown in FIG. 8, $W_{max}$ may indicate a maximum window size. $W_{step}$ may indicate a step size for increasing a window, and $Thres_{RC}$ may indicate a threshold value for reconnection.

FIG. 9 illustrates pseudo code for describing an operation of a controller, according to an embodiment of the disclosure.

The controller 100 according to an embodiment of the disclosure may transmit a first RCM. The controller 100 may determine whether a response with respect to a first RCM is received at a timing scheduled by the first RCM. The controller 100 may determine whether a response frame (or a response message) with respect to the first RCM has been received within a preset time range.

When the response frame has not been received (transmission of the first RCM has failed) from the controlee 200, the controller 100 may increment a counter $C_{RCMfail}$ by 1. When the counter $C_{RCMfail}$ is greater than a threshold value $Thres_{RC}$, the controller 100 may determine that recovery from a ranging failure is difficult to achieve. The controller 100 may perform reconnection with the controlee 200 when the counter $C_{RCMfail}$ is greater than the threshold value $Thres_{RC}$. When the number of ROMs failing to be continuously transmitted is greater than a threshold value, the controller 100 may determine that recovery from a ranging failure is difficult to achieve and perform reconnection with a second electronic device.

When the counter $C_{RCMfail}$ is less than or equal to the threshold value $Thres_{RC}$, the controller 100 may determine a size of a window to be used in a next ranging round, $W_{result}$. The controller 100 may increase an RCM timing window size as the number of continuous transmission failures of an RCM increases. The controller 100 may calculate $W_{result}$ based on Equation 1.

$$W_{result} = W_{II} W_{step} \times (2^{C_{RCMfail}-1} - 1)$$ [Equation 1]

When the window size $W_{result}$ determined based on Equation 1 is greater than a ranging round RI, the controller 100 may drop the ranging round RI. When the ranging round RI is dropped, it may mean that ranging is performed without considering the ranging round RI. When the determined window size $W_{result}$ is greater than the ranging round RI, the controlee 200 may continue to be awake.

The controller 100 may determine a transmission timing $T_{nextRCM}$ of the next RCM, based on $W_{result}$. As shown in FIG. 9, the controller 100 may determine the transmission timing $T_{nextRCM}$ at random during a time period from $T_{NR}-\min(W_{result}, W_{max}, T_{NR}-T_{now})$ to $T_{NR}+\min(W_{result}, W_{max})$ based on a next reference RCM timing $T_{NR}$. The controller 100 may transmit a second RCM at the determined transmission timing $T_{nextRCM}$.

Meanwhile, according to an embodiment of the disclosure, when the controller 100 receives a response to the first RCM (i.e., transmission of the first RCM is successful) at a timing scheduled by the first RCM, the controller 100 may reset the counter $C_{RCM\_fail}$ to 0. The controller 100 may determine the transmission timing of the next RCM, based on $W_{min}$. The controller 100 may transmit the second RCM at a time point determined at random during a time period from $T_{NR}-\min(W_{min}, T_{NR}-T_{now})$ to $(T_{NR}+W_{min})$.

FIG. 10 illustrates pseudo code for describing an operation of a controller, according to an embodiment of the disclosure.

The controlee 200 according to an embodiment of the disclosure may determine whether an RCM is received in a certain RCM timing window. The controlee 200 may determine a reference time point based on interval information included in the most recently received RCM, and determine a range of an RCM timing window based on the determined reference time point. When an RCM has not been received (reception of the RCM has failed) from the controller 100 in the range of the RCM timing window, the controlee 200 may increment the counter $C_{RCMfail}$ by 1. When the counter $C_{RCMfail}$ is greater than the threshold value $Thres_{RC}$, the controlee 200 may determine that recovery from a ranging failure is difficult to achieve. The controlee 200 may perform reconnection with the controller 100 when the counter $C_{RCMfail}$ is greater than the threshold value $Thres_{RC}$. When the counter $C_{RCMfail}$ is less than or equal to the threshold value $Thres_{RC}$, the controlee 200 may determine the size of the window to be used in the next ranging round, $W_{result}$. The controlee 200 may increase an RCM timing window size as the number of continuous transmission failures of an RCM increases. The controlee 200 may calculate $W_{result}$ based on Equation 1.

The controlee 200 may determine based on $W_{result}$, an RCM timing window in which the controlee 200 is awake to receive the RCM in the next ranging round. As shown in FIG. 10, the controlee 200 may be awake during a time period from $T_{NR}-\min(w_{result}, W_{max}, T_{NR}-T_{now})$ to $T_{NR}+\min(W_{result}, W_{max})$ based on the next reference RCM timing $T_{NR}$.

Meanwhile, when the controlee 200 according to an embodiment of the disclosure receives an RCM (i.e., reception of the RCM is successful) during a certain RCM timing window, the controlee 200 may reset the counter $C_{RCM}$ fail to 0. The controlee 200 may determine based on $W_{min}$, an RCM timing window in which the controlee 200 is awake to receive the RCM in the next ranging round. The controlee 200 may wait for reception of an RCM by being awake from $T_{NR}-\min(W_{min}, T_{NR}-T_{now})$ to $(T_{NR}+W_{min})$.

The controller 100 and the controlee 200 may have to use the same parameters to perform an RCM timing window operation. The controller 100 may transmit a command for setting ranging parameters to the controlee 200. The command may be included in a ranging interval update information element (RIU IE) in an RCM, an RIU message, or an RCU (Ranging Control Update) message. The controlee 200 may transmit a request for setting the ranging parameters to the controller 100. The request may be included in an RIU IE including an RCR(Ranging Change Request) IE.

FIG. 11 illustrates a content field format of an RIU IE, according to an embodiment of the disclosure.

The RIU IE may be used to update a ranging interval in an interval-based mode. An existing RIU IE may include at least one of a block interval field, a round interval field, an RIU interval field, or a remaining number of RUI messages. The RIU IE according to an embodiment of the disclosure may further include a field for specifying a parameter related to an RCM timing window operation. The RIU IE according to an embodiment of the disclosure may further include a field for specifying at least one of $W_{min}$, $W_{max}$, $W_{step}$, or $W_{II}$.

Meanwhile, an embodiment of the disclosure is not limited to a field format of the RIU IE shown in FIG. 11, and a field format of the RIU IE shown in FIG. 12 may be used.

FIG. 12 illustrates a content field format of an RIU IE, according to another embodiment of the disclosure.

The RIU IE shown in FIG. 12 may include a Round Interval Presence (RIP) field, an RIUP field, an RTWMP field, an RTWISP field, a block interval field, a round interval field, an RIU interval field, a remaining number of RIU messages field, an RTW multiplier field, and an RTW initial size field. The RIU IE may also include a reserved field.

The RIP field may indicate the presence of the Round Interval field. The RIP field value of 0 may mean that the round interval field is not present. The RIP field value of 1 may mean that the round interval field exists. If a Ranging Block consists of one Ranging Round, Round Interval is the same as Block Interval and Round Interval field can be omitted with a RIP field value of 0.

The RIUP field may indicate the presence of RIU Interval field and Remaining Number of RIU messages field. The RIUP field value of 0 may mean that the RIU Interval field and Remaining Number of RIU messages field are not present. the RIUP field value of 1 may mean that the RIU Interval field and the Remaining Number of RIU messages field are present.

The RTWMP field may indicate the presence of the RTW Multiplier field. An RTWMP field value of 0 may mean that the RTW Multiplier field is not present. An RTWMP field value of 1 means that the RTW Multiplier field is present.

The RTWISP field may indicate the presence of the RTW initial size field. An RTWISP field value of 0 may mean that the RTW Initial Size field is not present. An RTWISP field value of 1 may mean that the RTW Initial Size field is present.

The block interval field may specify a duration from a start time of the current frame including an RIU IE to a start time of a next ranging block. A value of the block interval field is expressed with a multiplier having a value TU, such that a block interval of a time scale is a product of the value of the block interval field and TU.

The round interval field if present, may specify the time remaining until the start time of the next RCM relative to the start time of the current frame. A value of the round interval field is expressed with a multiplier having a value TU, such that a round interval of a time scale is a product of the value of the round interval field and TU.

The RIU interval field if present, may specify the time remaining until the start time of the next RIU message relative to the start time of the current frame. A value of the RIU interval field is expressed with a multiplier having a value TU, such that an RIU interval of a time scale is a product of the value of the RIU interval field and TU.

The remaining number of RIU messages field may specify the remaining number of RIU frames until the next RCM.

The RTW multiplier field may specify an exponential multiplier of an RTW initial size to calculate a size of an RTW. The RTW initial size field may specify an initial size of the RTW.

When the RCM collides with another RCM and they have similar round intervals, then collision between the ROMs is not easy to avoid. When an RCM is not received at an expected timing, the controlee 200 may continue waiting for RCM reception. For example, the controller 100 and the controlee 200 may wait for exchanging ROMs in the entire ranging block. In this case, as the length of the ranging block increases, energy consumption may also increase.

To solve such a problem, according to an embodiment of the disclosure, a collision prevention method is proposed in which a transmission time point of an RCM is distributed using an RCM timing window (RTW). According to an embodiment of the disclosure, the controller 100 may transmit an RCM at a random timing in an RCM timing window when the controlee 200 is awake to receive the RCM in the RCM timing window. The controller 100 and the controlee 200 may not attempt to exchange ROMs out of the RCM timing window.

The RCM timing window operation may be configured by an RTWMP and an RTWISP in an RIU IE. In the RIU IE, when the RTWISP is 1 or both the RTWMP and the RTWISP are 1, the RCM timing window operation may be performed. When both the RTWMP and the RTWISP are 0, the controller 100 may transmit an RCM at a timing determined using a round interval in the RIU IE without using the RCM timing window. When the RTWISP is 1 and the RTWMP is 0, the controller 100 may transmit an RCM at a random timing in the RCM timing window and an RTW size may be fixed to the RTW initial size. When both the RTWISP and the RTWMP are 1, the controller 100 may transmit the RCM at the random timing in the RCM timing window and the RTW size may be changed with an RTW multiplier. The controlee 200 has to be awake to receive the RCM in the RCM timing window. The controller 100 and the controlee 200 may not attempt to exchange ROMs out of the RCM timing window.

Upon acknowledgement of reception of the RCM by a frame transmitted by the controlee 200, the controller 100 may determine success of the RCM. When the RCM is successful, the controller 100 may reset the RTW size and the RTW multiplier to the RTW initial size and 1, respectively.

When the RCM fails, the controller 100 may transmit the next RCM by using a round interval in an RCM of the most recently successful ranging round.

When transmission of the RCM fails, the controller 100 may increment an RTW multiplier. The controller 100 and the controlee 200 may change an RTW size by using the RTW initial size or the RTW multiplier. The RTW size may be determined as RTW Initial Size$\times 2^{RTW\ Multiplier}$. The RTW size may not exceed two times of a size of a round interval. The RCM timing window may be determined based on an expected round interval based on the most recently successful RCM. The controller 100 may randomly select a transmission timing of the next RCM in the RCM timing window. The controlee 200 may wait for reception of the RCM in the RCM timing window.

Figure 13:
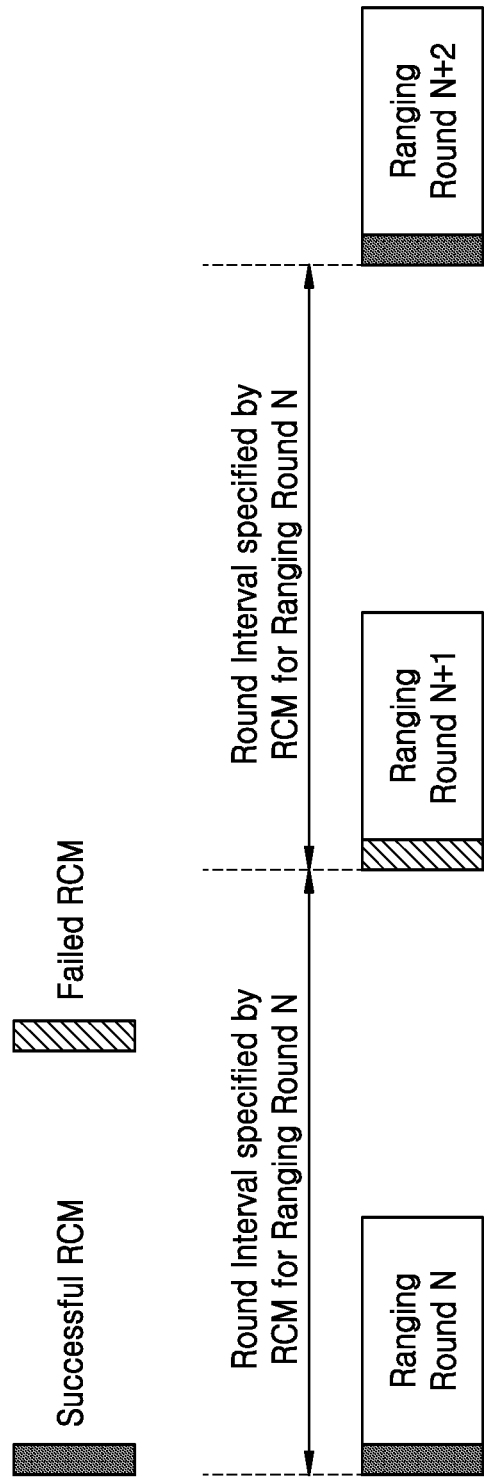
FIG. 13 is a timing diagram when an electronic device performs ranging operation without using an RCM timing window, according to an embodiment of the disclosure.

FIG. 13 is a timing diagram when an electronic device performs ranging operation without using an RCM timing window, according to an embodiment of the disclosure.

Referring to FIG. 13, ROMs may be transmitted in accurate round intervals without an RCM timing window. As an RCM of Ranging Round N+1 fails, an RCM of Ranging Round N+2 may be transmitted in a round interval designated by the most recently successful RCM (i.e., an RCM of Ranging Round N).

Figure 14:
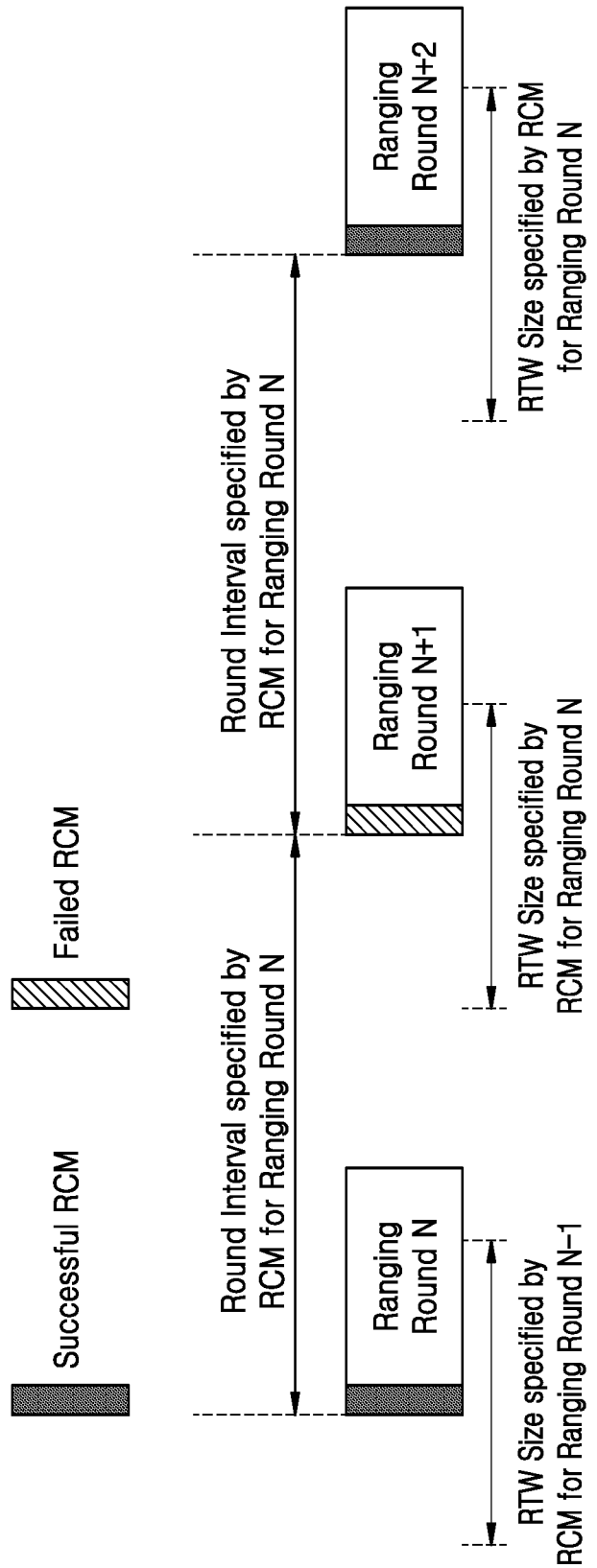
FIG. 14 is a timing diagram when an electronic device performs ranging operation using an RCM timing window, according to an embodiment of the disclosure.

FIG. 14 is a timing diagram when an electronic device performs ranging operation using an RCM timing window, according to an embodiment of the disclosure.

Referring to FIG. 14, ROMs may be transmitted at a random timing in an RCM timing window. As the RCM of Ranging Round N+1 fails, the RCM of Ranging Round N+2 may be transmitted in an RCM timing window determined based on an expected round interval of the most recently successful RCM (i.e., the RCM of Ranging Round N). The size of the RCM timing window used in Ranging Round N+2 may also be calculated by the RTW initial size and the RTW multiplier in the RCM of Ranging Round N.

Meanwhile, when the controlee 200 is awake at all times, the controller 100 may adjust the RTW size for contention resolution. When the ranging round fails, the controller 100 may exponentially increase the RTW size based on the number of consecutive RCM failures. When the ranging round is successful, the controller 100 may reset the RTW size to an initial value. As the controlee 200 acknowledges reception of a transmitted frame, the controller 100 may recognize whether the RCM is successful.

Figure 15:
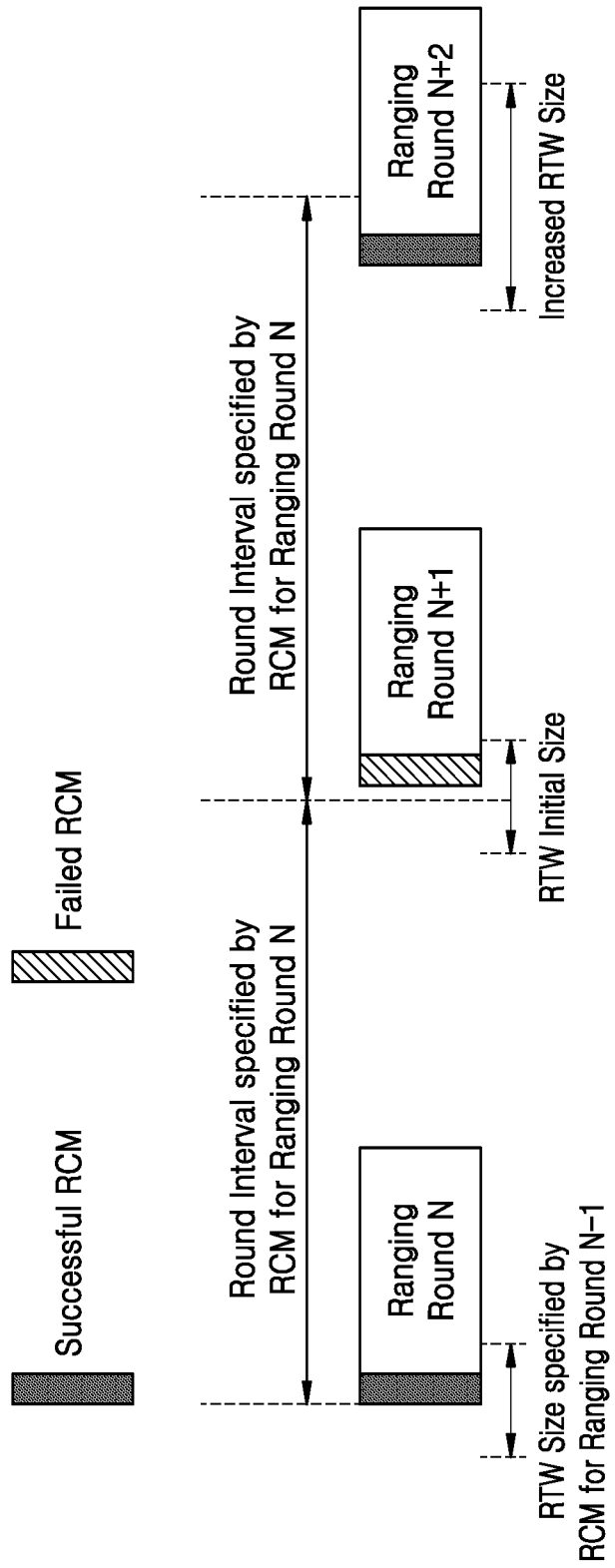
FIG. 15 is a timing diagram when an electronic device performs ranging using an RCM timing window with an increased size, according to an embodiment of the disclosure.

FIG. 15 is a timing diagram when an electronic device performs ranging operation using an RCM timing window with an increased size, according to an embodiment of the disclosure.

Referring to FIG. 15, an RCM may be transmitted at a random timing in an RCM timing window. As the RCM of Ranging Round N+1 fails, the RCM of Ranging Round N+2 may be transmitted in an RCM timing window determined based on an expected round interval determined based on the most recently successful RCM (i.e., the RCM of Ranging Round N). The size of the RCM timing window used in Ranging Round N+2 may be two times greater than the size of the RCM timing window used in Ranging Round N+1 by increase of the RTW multiplier.

Hereinbelow, an operation method of each of the controller 100 and the controlee 200 according to an embodiment of the disclosure will be described in detail. When ranging is performed between two electronic devices, one of the two electronic devices may be a controller and the other may be a controlee. Thus, in the following description, the controller 100 may be referred to as a first electronic device and the controlee 200 may be referred to as a second electronic device. However, terms "first", "second", etc., are used to distinguish devices from each other, and an embodiment of the disclosure is not limited to the following description, such that the controlee 200 may be referred to as a first electronic device and the controller 100 may be referred to as a second electronic device.

Figure 16:
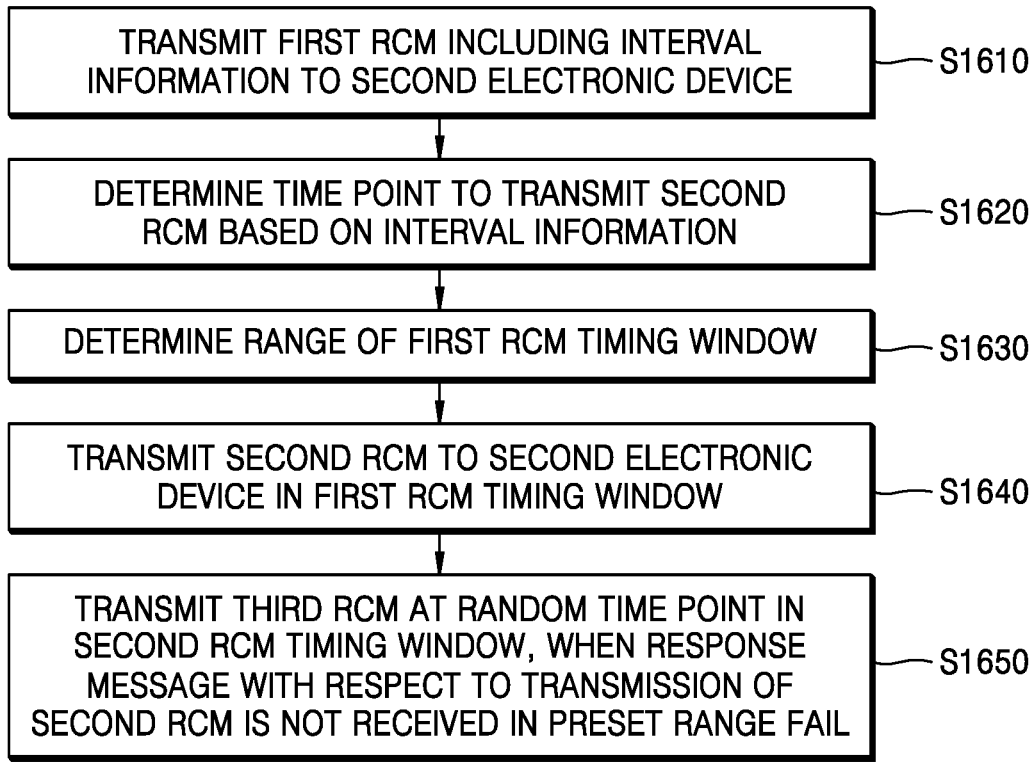
FIG. 16 is a flowchart illustrating a ranging operation method, performed by a first electronic device, by using an ultra wide-band (UWB) according to an embodiment of the disclosure.

FIG. 16 is a flowchart illustrating an operation method, performed by a first electronic device, of performing ranging through a UWB, according to an embodiment of the disclosure.

In operation S1610, the first electronic device according to an embodiment of the disclosure may transmit a first RCM including interval information to a second electronic device. The first electronic device may initiate a first ranging round by transmitting the first RCM. The first electronic device may transmit the first RCM to the second electronic device at a time point determined at random in an RCM timing window. The first electronic device may perform first ranging with the second electronic device in the first ranging round.

The first RCM according to an embodiment of the disclosure may include interval information related to a ranging interval, in which the interval information may include an RTW initial size and an RTW multiplier for determining the RTW size. The first electronic device may identify the RTW initial size and the RTW multiplier from the first RCM.

The RTW multiplier may be used for determining the RTW size.

In operation S1620, the first electronic device according to an embodiment of the disclosure may determine a time point to transmit the second RCM based on the interval information included in the first RCM.

In operation S1630, the first electronic device according to an embodiment of the disclosure may determine a range of a first RCM timing window, based on the determined time point. The first electronic device may determine a reference RCM timing based on the interval information and determine the range of the first RCM timing window based on the reference RCM timing.

In operation S1640, the first electronic device according to an embodiment of the disclosure may transmit a second RCM to the second electronic device in the first RCM timing window.

The first electronic device according to an embodiment of the disclosure may transmit the second RCM at a random time point in the first RCM timing window. The first electronic device according to an embodiment of the disclosure may determine whether a response message with respect to transmission of the second RCM is received in a preset time period within the first RCM timing window.

In operation S1650, the first electronic device according to an embodiment of the disclosure may transmit a third RCM in a second RCM timing window, based on a transmission result of the second RCM.

The first electronic device according to an embodiment of the disclosure may transmit the third RCM at a random time point in the second RCM timing window when the first electronic device fails to receive the response message with respect to transmission of the second RCM in the preset time period. The first electronic device may determine that transmission of the second RCM fails, when a message scheduled by the second RCM is not received in a certain time. The first electronic device may transmit the third RCM in the second RCM timing window, when the first electronic device determines that transmission of the second RCM fails. The second RCM timing window may be determined based on round interval information included in the first RCM.

For example, the second RCM timing window may have the same size as the first RCM timing window.

In another example, the size of the second RCM timing window may be increased from the size of the first RCM timing window. The first electronic device according to an embodiment of the disclosure may determine the second RCM timing window having the increased size when compared to the first RCM timing window, when the first electronic device fails to receive the response message with respect to transmission of the second RCM in the preset time period. The first electronic device according to an embodiment of the disclosure may transmit the third RCM at a random time point in the second RCM timing window with the increased size.

According to an embodiment of the disclosure, to lower a probability of ROMs colliding in the next ranging round, the first electronic device may increase the size of the RCM timing window when transmission of the RCM fails. The first electronic device may determine the increased size of the second RCM timing window, $W_{result}$, based on Equation 2.

$$W_{result} = RTW \text{ Initial Size} \times 2^{RTW\ Multiplier} \quad \text{[Equation 2]}$$

The first electronic device may transmit the third RCM at a random time point in the second RCM timing window.

The first electronic device according to an embodiment of the disclosure may determine that transmission of the second RCM is successful, when the message scheduled by the second RCM is received in the certain time. The first electronic device may transmit the third RCM in the third RCM timing window determined based on the round interval information included in the second RCM, when the first electronic device determines that transmission of the second RCM is successful.

The first electronic device may count the number of consecutive ROMs that fail in transmission. According to an embodiment of the disclosure, the first electronic device may increase a size of an RCM timing window upon an increase in the number of failures in transmission of an RCM, thus reducing a probability of collision between next ROMs. However, when the number of ROMs failing to be continuously transmitted is greater than a threshold value, the first electronic device may determine that recovery from a ranging failure is difficult to achieve and perform reconnection with a second electronic device.

Figure 17:
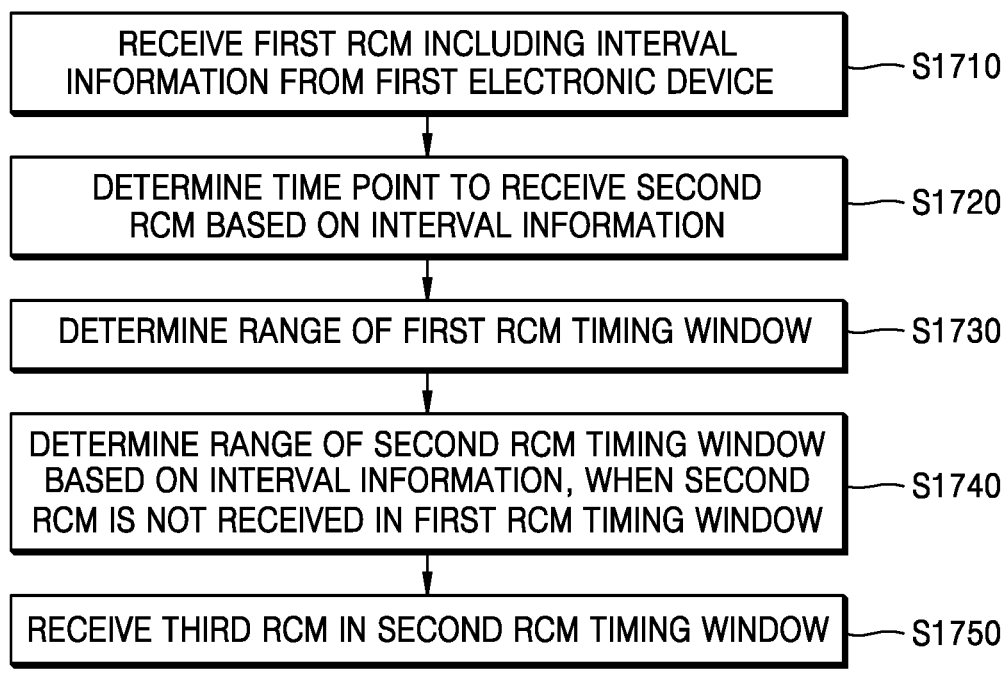
FIG. 17 is a flowchart illustrating a ranging operation method, performed by a second electronic device, by using UWB according to an embodiment of the disclosure.

FIG. 17 is a flowchart illustrating an operation method, performed by a second electronic device, of performing ranging through a UWB, according to an embodiment of the disclosure.

In operation S1710, the second electronic device according to an embodiment of the disclosure may receive a first RCM including interval information from the first electronic device. The second electronic device may initiate a first ranging round by receiving the first RCM, and perform first ranging. The second electronic device according to an embodiment of the disclosure may wait for reception of the first RCM by being awake in a certain RCM timing window. When the first RCM is received, the second electronic device may perform first ranging based on the first RCM.

The first RCM may include interval information related to a ranging interval. The interval information may include an RTW initial size and an RTW multiplier for determining the RTW size. The second electronic device may identify the RTW initial size and the RTW multiplier for determining the size of the RCM timing window from the received first RCM.

In operation S1720, the second electronic device according to an embodiment of the disclosure may determine a time point to receive the second RCM based on the interval information included in the first RCM.

In operation S1730, the second electronic device according to an embodiment of the disclosure may determine a range of the first RCM timing window, based on the determined time point. The second electronic device may determine a reference RCM timing based on the interval information and determine the range of the first RCM timing window based on the reference RCM timing.

In operation S1740, the second electronic device according to an embodiment of the disclosure may determine a range of the second RCM timing window, based on whether the second RCM is received in the first RCM timing window. As the first RCM is successfully received in the first ranging round, the second electronic device may be awake in the first RCM timing window determined based on an RTW initial size included in the first RCM.

The second electronic device may determine that reception of the second RCM fails, when the second RCM is not received in the first RCM timing window. The second electronic device may determine the second RCM timing window, when the second electronic device determines that reception of the second RCM fails.

For example, the second RCM timing window may have the same size as the first RCM timing window.

In another example, the second electronic device may determine that reception of the second RCM fails, when the second RCM is not received in the first RCM timing window. The second electronic device may determine the second RCM timing window with the size increased when compared to the first RCM timing window, when the second electronic device determines that reception of the second RCM fails. The second electronic device may determine the increased size of the second RCM timing window, $W_{result}$, based on Equation 2.

The second electronic device according to an embodiment of the disclosure may determine that reception of the second RCM is successful, when the second RCM is received in the second RCM timing window. The second electronic device may determine the second RCM timing window based on the round interval information included in the second RCM, when the first electronic device determines that reception of the second RCM is successful.

In operation S1750, the second electronic device according to an embodiment of the disclosure may receive the third RCM in the second RCM timing window.

The second electronic device according to an embodiment of the disclosure may wait for reception of the third RCM by being awake in the second RCM timing window. When the third RCM is received, the second electronic device may perform second ranging based on the third RCM.

The second electronic device according to an embodiment of the disclosure may count the number of ROMs that fail in transmission. According to an embodiment of the disclosure, the second electronic device may increase a size of an RCM timing window upon an increase in the number of failures in transmission of an RCM, thus reducing a probability of collision between next ROMs. However, when the number of ROMs failing to be continuously transmitted is greater than a threshold value, the second electronic device may determine that recovery from a ranging failure is difficult to achieve and perform reconnection with the first electronic device.

As described above, according to an embodiment of the disclosure, as electronic devices exchange ROMs at a time point determined at random in an RCM timing window, after a failure in transmission of an RCM, a ranging failure does not continuously occur and fast recovery from the ranging failure may be possible in the next ranging round.

Hereinbelow, a specific configuration of electronic devices will be described.

Figure 18:
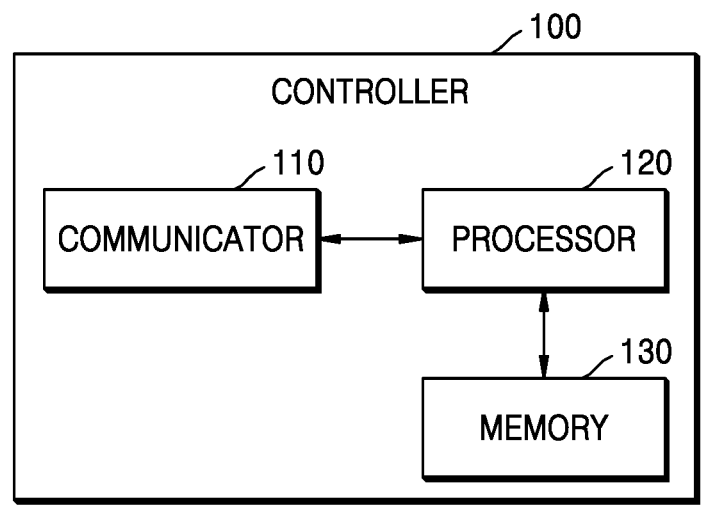
FIG. 18 is a block diagram of a controller according to an embodiment of the disclosure.

FIG. 18 is a block diagram of a controller according to an embodiment of the disclosure.

The controller 100 according to various embodiments of the disclosure may be a fixed terminal or a mobile terminal. The controller 100 may be, for example, but not limited to, at least one of a smart phone, a navigation device, a computer, a digital broadcasting terminal, a smart appliance, an artificial intelligence speaker, a personal digital assistant (PDA), a portable multimedia player (PMP), a smart key, or a wearable device. The controller 100 may communicate with another device and/or a server through a network by using a wireless or wired communication scheme.

Referring to FIG. 18, the controller 100 according to various embodiments of the disclosure may include a communicator 110, a processor 120, and a memory 130. However, the controller 100 may be implemented with more components or less components than the components shown in FIG. 18.

While the controller 100 is illustrated as including one processor in FIG. 18, the embodiment of the disclosure is not limited to illustration, and the controller 100 may include a plurality of processors. Hereinbelow, at least some of operations and functions of the processor 120 described below may be performed by a plurality of processors. The controller 100 shown in FIG. 18 may perform the operation method of the controller 100 according to various embodiments of the disclosure, and descriptions made with reference to FIGS. 1 through 17 may be applied. Thus, matters overlapping with the foregoing description will be omitted.

The communicator 110 according to an embodiment of the disclosure may perform wireless/wired communication with another device or a network. To this end, the communicator 110 may include a communication module supporting at least one of various wireless/wired communication methods. For example, a communication module may have the form of a chipset or may be a sticker/barcode (e.g., a sticker including a near field communication (NFC) tag), or the like.

The wireless communication may include, for example, at least one of wireless fidelity (Wi-Fi), Wi-Fi Direct, Bluetooth, a UWB, or near field communication (NFC). The wired communication may include, for example, at least one of a universal serial bus (USB) or a high-definition multimedia interface (HDMI).

According to an embodiment of the disclosure, the communicator 110 may include a communication module for short-range communication. For example, the communicator 110 may include a communication module for performing various short-range communications, such as infrared communication, magnetic secure transmission (MST), and magnetic security communication as well as UWB, Wi-Fi, Wi-Fi Direct, Bluetooth, or NFC.

According to an embodiment of the disclosure, the communicator 110 according to an embodiment of the disclosure may communicate with the controlee 200 by using a first communication scheme or a second communication scheme. For example, the second communication scheme may be a UWB communication scheme, and the first communication scheme may be different from the second communication scheme. For example, the first communication scheme may be, but not limited to, a Bluetooth communication scheme.

The processor 120 according to an embodiment of the disclosure may control an overall operation of the controller 100 by executing a program stored in the memory 130, and may include at least one processor such as a CPU, a GPU, etc. The processor 120 may control other components included in the controller 100 to perform UWB ranging.

The description made with reference to FIG. 16 may be applied to a specific method, performed by the processor 120, of performing ranging by controlling an overall operation of the controller 100, and a redundant description may be omitted.

According to an embodiment of the disclosure, the processor 120 according to an embodiment of the disclosure may transmit a first RCM including interval information to the controlee 200 through the communicator 110. The processor 120 may initiate a first ranging round by transmitting the first RCM. The processor 120 may transmit the first RCM to the controlee 200 at a time point determined at random in an RCM timing window. The controller 100 may perform first ranging with the controlee 200 in the first ranging round.

According to an embodiment of the disclosure, the first RCM according to an embodiment of the disclosure may include interval information, in which the interval information may include an RTW initial size and an RTW multiplier for determining the size of the RCM timing window. The controller 100 may identify the RTW initial size and the RTW multiplier for determining the size of the RCM timing window from the first RCM.

The processor 120 may determine a time point to transmit the second RCM to the controlee 200 based on the interval information included in the first RCM.

According to an embodiment of the disclosure, the processor 120 may determine a range of the first RCM timing window, based on the determined time point. The processor 120 may determine a reference RCM timing based on the interval information and determine the range of the first RCM timing window based on the reference RCM timing.

According to an embodiment of the disclosure, the processor 120 may transmit a second RCM to the controlee 200 in the first RCM timing window through the communicator 110. The processor 120 may transmit the second RCM at a random time point in the first RCM timing window. According to an embodiment of the disclosure, the processor 120 may determine whether a response message with respect to transmission of the second RCM is received in a preset time period in the first RCM timing window.

According to an embodiment of the disclosure, the processor 120 may transmit a third RCM in a second RCM timing window, based on a transmission result of the second RCM.

The processor 120 according to an embodiment of the disclosure may transmit the third RCM at a random time point in the second RCM timing window when the first electronic device fails to receive the response message with respect to transmission of the second RCM in the preset range. The processor 120 may determine that transmission of the second RCM fails, when a message scheduled by the second RCM is not received in a certain time. The processor 120 may transmit the third RCM in the second RCM timing window, when the first electronic device determines that transmission of the second RCM fails. The second RCM timing window may be determined based on round interval information included in the first RCM.

For example, the second RCM timing window may have the same size as the first RCM timing window.

In another example, the size of the second RCM timing window may be increased from the size of the first RCM timing window. According to an embodiment of the disclosure, the processor 120 may determine the second RCM timing window having the increased size when compared to the first RCM timing window, when the first electronic device fails to receive the response message with respect to transmission of the second RCM in the preset range. According to an embodiment of the disclosure, the processor 120 may transmit the third RCM at a random time point in the second RCM timing window with the increased size.

According to an embodiment of the disclosure, to lower a probability of ROMs colliding in the next ranging round, the processor 120 may increase the size of the RCM timing window when transmission of the RCM fails. The processor 120 may determine the increased size of the second RCM timing window, $W_{result}$, based on Equation 2.

According to an embodiment of the disclosure, the processor 120 according to an embodiment of the disclosure may determine that transmission of the second RCM is successful, when the message scheduled by the second RCM is received in the certain time. The processor 120 may transmit the third RCM in the third RCM timing window determined based on the round interval information included in the second RCM, when the first electronic device determines that transmission of the second RCM is successful.

The processor 120 may count the number of consecutive ROMs that fail in transmission. According to an embodiment of the disclosure, the processor 120 may increase a size of an RCM timing window upon an increase in the number of failures in transmission of an RCM, thus reducing a probability of collision between next ROMs. However, when the number of ROMs failing to be continuously transmitted is greater than a threshold value, the processor 120 may determine that recovery from a ranging failure is difficult to achieve and perform reconnection with the controlee 200.

Figure 19:
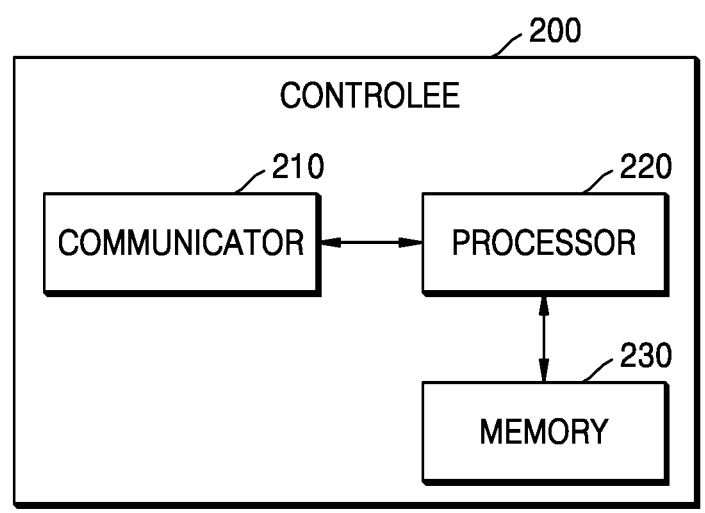
FIG. 19 is a block diagram of a controlee according to an embodiment of the disclosure.

FIG. 19 is a block diagram of a controlee according to an embodiment of the disclosure.

According to an embodiment of the disclosure, the controlee 200 may be a fixed terminal or a mobile terminal. The controlee 200 may be, for example, but not limited to, at least one of a smart phone, a navigation device, a computer, a digital broadcasting terminal, a smart appliance, an artificial intelligence speaker, a PDA, a PMP, a smart key, or a wearable device. The controlee 200 may communicate with another device and/or a server through a network by using a wireless or wired communication scheme.

Referring to FIG. 19, according to an embodiment of the disclosure, the controlee 200 may include a communicator 210, a processor 220, and a memory 230. However, the controlee 200 may be implemented with more components or less components than the components shown in FIG. 19.

While the controlee 200 is illustrated as including one processor in FIG. 19, the embodiment of the disclosure is not limited to illustration, and the controlee 200 may include a plurality of processors. Hereinbelow, at least some of operations and functions of the processor 220 described below may be performed by a plurality of processors. The controlee 200 shown in FIG. 19 may perform an operation method according to various embodiments of the disclosure, and descriptions made with reference to FIGS. 1 through 17 may be applied. Thus, matters overlapping with the foregoing description will be omitted.

According to an embodiment of the disclosure, the communicator 210 may perform wireless/wired communication with another device or a network. To this end, the communicator 210 may include a communication module supporting at least one of various wireless/wired communication methods. For example, a communication module may have the form of a chipset or may be a sticker/barcode (e.g., a sticker including an NFC tag), or the like.

The wireless communication may include, for example, at least one of Wi-Fi, Wi-Fi Direct, Bluetooth, a UWB, or NFC. The wired communication may include, for example, at least one of a USB or a high-definition multimedia interface (HDMI).

According to an embodiment of the disclosure, the communicator 210 may include a communication module for short-range communication. For example, the communicator 210 may include a communication module for performing various short-range communications, such as infrared communication, MST, and magnetic security communication as well as UWB, Wi-Fi, Wi-Fi Direct, Bluetooth, or NFC.

According to an embodiment of the disclosure, the communicator 210 may communicate with the controller 100 by using a first communication scheme or a second communication scheme. For example, the second communication scheme may be a UWB communication scheme, and the first communication scheme may be different from the second communication scheme. For example, the first communication scheme may be, but not limited to, a Bluetooth communication scheme.

According to an embodiment of the disclosure, the processor 220 may control an overall operation of the controlee 200 by executing a program stored in the memory 230, and may include at least one processor such as a CPU, a GPU, etc. The processor 220 may control other components included in the controlee 200 to perform UWB ranging. The description made with reference to FIG. 17 may be applied to a specific method, performed by the processor 220, of performing ranging by controlling an overall operation of the controlee 200, and a redundant description may be omitted.

According to an embodiment of the disclosure, the processor 220 may transmit a first RCM including interval information to the controller 100. The processor 220 may initiate a first ranging round by receiving the first RCM, and perform first ranging. According to an embodiment of the disclosure, the processor 220 may wait for reception of the first RCM by being awake in a certain RCM timing window. When the first RCM is received, the processor 220 may perform first ranging based on the first RCM.

The first RCM may include interval information related to a ranging interval. The interval information may include an RTW initial size and an RTW multiplier for determining the size of the RCM timing window. The processor 220 may identify the RTW initial size and the RTW multiplier for determining the size of the RCM timing window from the received first RCM.

According to an embodiment of the disclosure, the processor 220 may determine a time point to receive the second RCM based on the interval information included in the first RCM.

According to an embodiment of the disclosure, the processor 220 may determine a range of the first RCM timing window, based on the determined time point. The processor 220 may determine a reference RCM timing based on the interval information and determine the range of the first RCM timing window based on the reference RCM timing.

According to an embodiment of the disclosure, the processor 220 may determine a range of the second RCM timing window, based on whether the second RCM is received in the first RCM timing window. As the first RCM is successfully received in the first ranging round, the processor 220 may be awake in the first RCM timing window determined based on an RTW initial size included in the first RCM.

The processor 220 may determine that reception of the second RCM fails, when the second RCM is not received in the first RCM timing window. The processor 220 may determine the second RCM timing window, when the second electronic device determines that reception of the second RCM fails.

For example, the second RCM timing window may have the same size as the first RCM timing window.

In another example, the processor 220 may determine that reception of the second RCM fails, when the second RCM is not received in the first RCM timing window. The processor 220 may determine the second RCM timing window with the size increased when compared to the first RCM timing window, when the second electronic device determines that reception of the second RCM fails. The processor 220 may determine the increased size of the second RCM timing window, $W_{result}$, based on Equation 20.

According to an embodiment of the disclosure, the processor 220 may determine that reception of the second RCM is successful, when the second RCM is received in the second RCM timing window. The processor 220 may determine the second RCM timing window based on the round interval information included in the second RCM, when the first electronic device determines that reception of the second RCM is successful.

According to an embodiment of the disclosure, the processor 220 may receive the third RCM in the second RCM timing window.

The processor 220 according to an embodiment of the disclosure may wait for reception of the third RCM by being awake in the second RCM timing window. When the third RCM is received, the processor 220 may perform second ranging based on the third RCM.

According to an embodiment of the disclosure, the processor 220 may count the number of ROMs that fail in transmission. According to an embodiment of the disclosure, the processor 220 may increase a size of an RCM timing window upon an increase in the number of failures in transmission of an RCM, thus reducing a probability of collision between next ROMs. However, when the number of ROMs failing to be continuously transmitted is greater than a threshold value, the processor 220 may determine that recovery from a ranging failure is difficult to achieve and perform reconnection with the controlee 200.

As described above, according to an embodiment of the disclosure, as electronic devices exchange ROMs at a time point determined at random in an RCM timing window, after a failure in transmission of an RCM, a ranging failure does not continuously occur and fast recovery from the ranging failure may be possible in the next ranging round.

At least one of the components, elements, modules or units (collectively "components" in this paragraph) of the disclosure may be embodied as various numbers of hardware, software and/or firmware structures that execute respective functions described above, according to an embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Moreover, embodiments of the disclosure may be implemented as a software (S/W) program including an instruction stored in a computer-readable storage media.

The computer may invoke stored instructions from the storage medium and operate based on the invoked instructions according to the disclosed embodiment of the disclosure, and may include an image transmission device and an image reception device according to the disclosed embodiments of the disclosure.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The electronic device or the operation method according to the embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a SNV program electronically distributed through a manufacturer or the electronic device or an electronic market (e.g., Google Play Store or App Store). For the electronic distribution, at least a portion of the SNV program may be stored in a storage medium or temporarily generated. In this case, the storage medium may be a storage medium of a server in the manufacturer or the electronic market or a relay server that temporarily stores the SNV program.

The computer program product may include a storage medium of a server or a storage medium of a terminal (e.g., an image transmission device or an image reception device), in a system including the server and the terminal. Alternatively, when there is a third device (e.g., a smart phone) communicating with the server or the terminal, the computer program product may include a storage medium of the third device. Alternatively, the computer program product may include a S/W program itself, which is transmitted from the server to the terminal or the third device or transmitted from the third device to the terminal.

In this case, one of the server, the terminal, and the third device may execute the computer program product to perform the operation method according to the embodiments of the disclosure. Alternatively, two or more of the server, the terminal, and the third device may execute the computer program product to execute the operation method according to the embodiments of the disclosure in a distributed manner.

For example, a server (e.g., a cloud server or an AI server, etc.) may execute a computer program product stored in the server to control the terminal communicating with the server to perform the operation method according to the embodiments of the disclosure.

In another example, the third device may execute the computer program product to control the terminal communicated with the third device to perform the operation method according the disclosed embodiment of the disclosure. More specifically, the third device may remotely control the image transmission device or the image reception device to transmit or receive a packing image.

When the third device executes the computer program product, the third device may download the computer program product and execute the downloaded computer program product. Alternatively, the third device may execute a computer program product provided in a preloaded state to execute the operation method according to the disclosed embodiments of the disclosure.

What is claimed is:

1. An operation method of a first electronic device that performs ranging operation by using an ultra wide-band (UWB), the operation method comprising:

transmitting a first ranging control message (RCM) comprising interval information to a second electronic device;

determining, based on the interval information, a first time related to a start time of a next ranging round;

determining a first RCM timing window (RTW) based on the first time;

transmitting a second RCM to the second electronic device in the first RTW; and transmitting a third RCM at a second time in a second RTW, based on a failure to receive a ranging message related to the second RCM, wherein the second time is a random time point in the second RTW, wherein the interval information in the first RCM comprises a first field indicating whether a RTW initial size is present, and a second field indicating whether a RTW multiplier value is present, and wherein, in a case that the first field indicates a presence of the RTW initial size, the interval information included in the first RCM comprises the RTW initial size for the first RTW, and in a case that the second field indicates a presence of the RTW multiplier value, the interval information comprises the RTW multiplier value for the first RTW.

2. The operation method of claim 1, wherein the transmitting of the second RCM comprises transmitting the second RCM at a random time in the first RTW.

3. The operation method of claim 1, wherein the second RTW has a first size that is same as a second size of the first RTW.

4. The operation method of claim 1, wherein the second RTW has a first size larger than a second size of the first RTW.

5. The operation method of claim 1, wherein
a size, Wresult, of the first RTW is determined based on following equation:

$$W\_result = RTW\ Initial\ Size \times 2^{-(RTW\ Multiplier\ value)}.$$

6. An operation method of a second electronic device that performs ranging by using an ultra wide-band (UWB), the operation method comprising:

receiving a first ranging control message (RCM) comprising interval information from a first electronic device;

determining, based on the interval information, a first time related to a start time of a next ranging round;

determining a first RTW based on the first time;

determining a second RTW based on the interval information, based on a failure to receive a second RCM in the first RTW; and receiving a third RCM transmitted at a second time in the second RTW, wherein the second time is a random time point in the second RTW, wherein the interval information in the first RCM comprises a first field indicating whether a RTW initial size is present, and a second field indicating whether a RTW multiplier value is present, and wherein, in a case that the first field indicates a presence of the RTW initial size, the interval information included in the first RCM comprises the RTW initial size for the first RTW, and in a case that the second field indicates a presence of the RTW multiplier value, the interval information comprises the RTW multiplier value for the first RTW.

7. The operation method of claim 6, wherein the determining of the second RTW comprises:

determining that the receiving of the second RCM has failed, based on the failure to receive the second RCM in the first RTW; and determining the second RTW based on the interval information, based on the determination that the receiving of the second RCM has failed.

8. The operation method of claim 6, wherein the second RTW has a first size that is same as a second size of the first RTW.

9. The operation method of claim 6, wherein the second RTW has a first size larger than a second size of the first RTW.

10. The operation method of claim 6, wherein
a size, Wresult, of the first RTW is determined based on flowing equation:

$$W\_result = RTW\ Initial\ Size \times 2^{-(RTW\ Multiplier\ value)}.$$

11. A first electronic device that performs a ranging operation by using an ultra wide-band (UWB), the first electronic device comprising:

a communicator;

a memory; and at least one processor configured to control an operation of the first electronic device by executing a program stored in the memory, wherein the at least one processor is further configured to:

transmit a first ranging control message (RCM) comprising interval information to a second electronic device;

determine, based on the interval information, a first time related to a start time of a next ranging round;

determine a first RTW based on the first time;

transmit a second RCM to the second electronic device in the first RTW; and transmit a third RCM at a second time in a second RTW, based on a failure to receive a ranging message related to the second RCM, wherein the second time is a random time point in the second RTW, wherein the interval information in the first RCM comprises a first field indicating whether a RTW initial size is present, and a second field indicating whether a RTW multiplier value is present, and wherein, in a case that the first field indicates a presence of the RTW initial size, the interval information included in the first RCM comprises the RTW initial size for the first RTW, and in a case that the second field indicates a presence of the RTW multiplier value, the interval information comprises the RTW multiplier value for the first RTW.

12. A second electronic device that performs a ranging operation by using an ultra wide-band (UWB), the second electronic device comprising:

a communicator;

a memory; and at least one processor configured to control an operation of the second electronic device by executing a program stored in the memory, wherein the at least one processor is further configured to:

receive a first ranging control message (RCM) comprising interval information from a first electronic device;

determine, based on the interval information, a first time related to a start time of a next ranging round;

determine a first RTW based on the first time; and determine a second RTW based on the interval information, when a second RCM is not received in the first RTW, and receive a third RCM transmitted at a second time in the second RTW, wherein the second time is a random time point in the second RTW, wherein the interval information in the first RCM comprises a first field indicating whether a RTW initial size is present, and a second field indicating whether a RTW multiplier value is present, and wherein, in a case that the first field indicates a presence of the RTW initial size, the interval information included in the first RCM comprises the RTW initial size for the First RTW, and in a case that the second field indicates a presence of the RTW multiplier value, the interval information comprises the RTW multiplier value for the first RTW.

* * * * *